US008566513B2

(12) United States Patent
Yamashita

(10) Patent No.: US 8,566,513 B2
(45) Date of Patent: Oct. 22, 2013

(54) SEMICONDUCTOR MEMORY DEVICE THAT STORES A REWRITE FREQUENCY OF A NONVOLATILE MEMORY INCLUDED IN THE SEMICONDUCTOR MEMORY DEVICE

(75) Inventor: Hideaki Yamashita, Kyoto (JP)

(73) Assignee: Panasonic Corporation, Osaka (JP)

( * ) Notice: Subject to any disclaimer, the term of this patent is extended or adjusted under 35 U.S.C. 154(b) by 255 days.

(21) Appl. No.: 13/036,218

(22) Filed: Feb. 28, 2011

(65) Prior Publication Data

US 2011/0283053 A1 Nov. 17, 2011

(30) Foreign Application Priority Data

May 12, 2010 (JP) ................................. 2010-109797

(51) Int. Cl.
*G06F 12/02* (2006.01)
*G06F 17/30* (2006.01)

(52) U.S. Cl.
CPC ...... *G06F 12/0246* (2013.01); *G06F 17/30218* (2013.01); *G06F 2212/7211* (2013.01)
USPC ..... 711/103; 707/824; 711/156; 711/E12.008

(58) Field of Classification Search
USPC .......................................................... 707/847
See application file for complete search history.

(56) References Cited

U.S. PATENT DOCUMENTS

| 5,734,816 | A | * | 3/1998 | Niijima et al. | ................ | 714/6.13 |
| 5,832,493 | A | * | 11/1998 | Marshall et al. | ............... | 707/697 |
| 5,963,970 | A | * | 10/1999 | Davis | ............................ | 711/103 |
| 7,032,087 | B1 | * | 4/2006 | Chang et al. | ................... | 711/156 |
| 7,103,732 | B1 | * | 9/2006 | Chang et al. | ................... | 711/156 |
| 8,031,521 | B1 | * | 10/2011 | Yang | ......................... | 365/185.02 |
| 2005/0091445 | A1 | * | 4/2005 | Chang et al. | ................... | 711/103 |
| 2007/0106919 | A1 | * | 5/2007 | Chang et al. | ................... | 713/300 |
| 2009/0164440 | A1 | * | 6/2009 | Pudipeddi et al. | ................ | 707/3 |
| 2010/0153476 | A1 | * | 6/2010 | Matsushima | ................. | 707/822 |
| 2012/0102259 | A1 | * | 4/2012 | Goss et al. | .................... | 711/103 |

FOREIGN PATENT DOCUMENTS

JP 2005-284659 10/2005

OTHER PUBLICATIONS

RyderOCZ. "SMART Attributes for SandForce SSD's '2' and '3' series." Jul. 2010. http://www.ocztechnologyforum.com/forum/showthread.php?75786-SMART-Attributes-for-SandForce-SSD-s-quot-2-quot-and-quot-3-quot-series.*
Lamont Wood. "Forgotten PC history: The true origins of the personal computer." Aug. 2008. http://www.researchhistory.org/2011/04/17/forgotten-pc-history-the-true-origins-of-the-personal-computer/.*
Jim Hatfield. "SMART Attribute Annex." Sep. 2005. Technical Committee T13. http://www.t13.org/Documents/UploadedDocuments/docs2005/e05148r0-ACS-SMARTAttributesAnnex.pdf.*

* cited by examiner

*Primary Examiner* — Nathan Sadler
(74) *Attorney, Agent, or Firm* — Wenderoth, Lind & Ponack, L.L.P.

(57) ABSTRACT

A semiconductor memory device that stores information includes: a flash memory that is managed by a predetermined file system having a parameter dependent on the semiconductor memory device; a rewrite frequency storage unit that stores a rewrite frequency of the flash memory; an ID detection unit that detects whether or not first identification information associated with the rewrite frequency is stored in the flash memory as the parameter; and a control unit that, when the ID detection unit detects that the first identification information is stored, reflects the rewrite frequency stored in the rewrite frequency storage unit, on a storage area corresponding to the first identification information.

18 Claims, 14 Drawing Sheets

FIG. 2A
OEM Parameters

| BP | Length (Byte) | Field Name | Contents |
|---|---|---|---|
| 0 | 48 | Parameters[0] | Generic Parameters Template |
| : | : | : | : |
| 432 | 48 | Parameters[9] | Generic Parameters Template |
| 480 | 32 | Reserved | All 00h |

FIG. 2B
Generic Parameters Template

| BP | Length (Byte) | Field Name | Contents |
|---|---|---|---|
| 0 | 16 | ParametersGuid | GUID |
| 16 | 32 | CustomDefined | Not Restricted |

FIG. 4

| BP | Block number | Rewrite frequency |
|---|---|---|
| 1 | 1 | 400 |
| 2 | 2 | 500 |
| ⋮ | ⋮ | ⋮ |
| 8 | 8 | 300 |

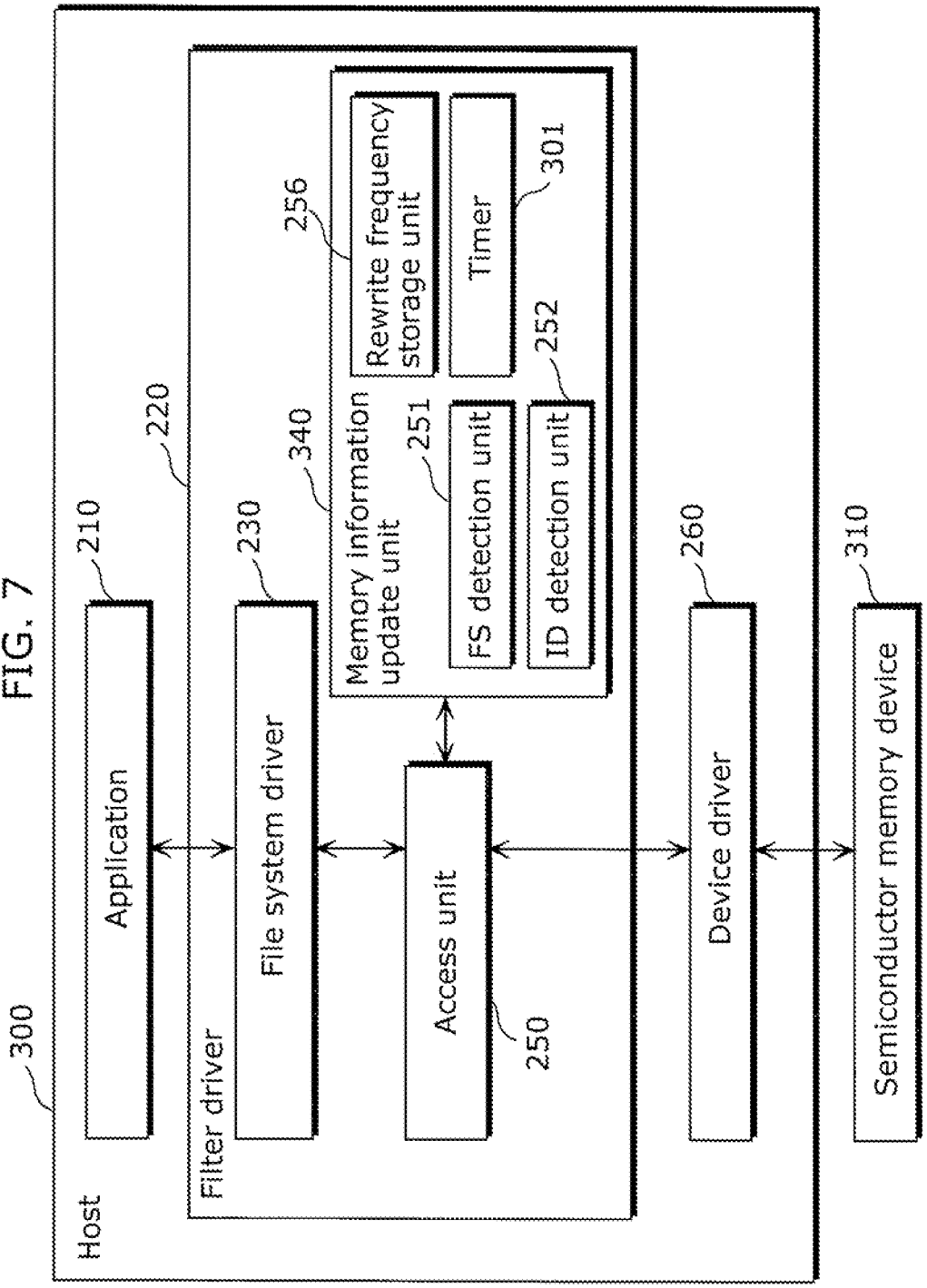

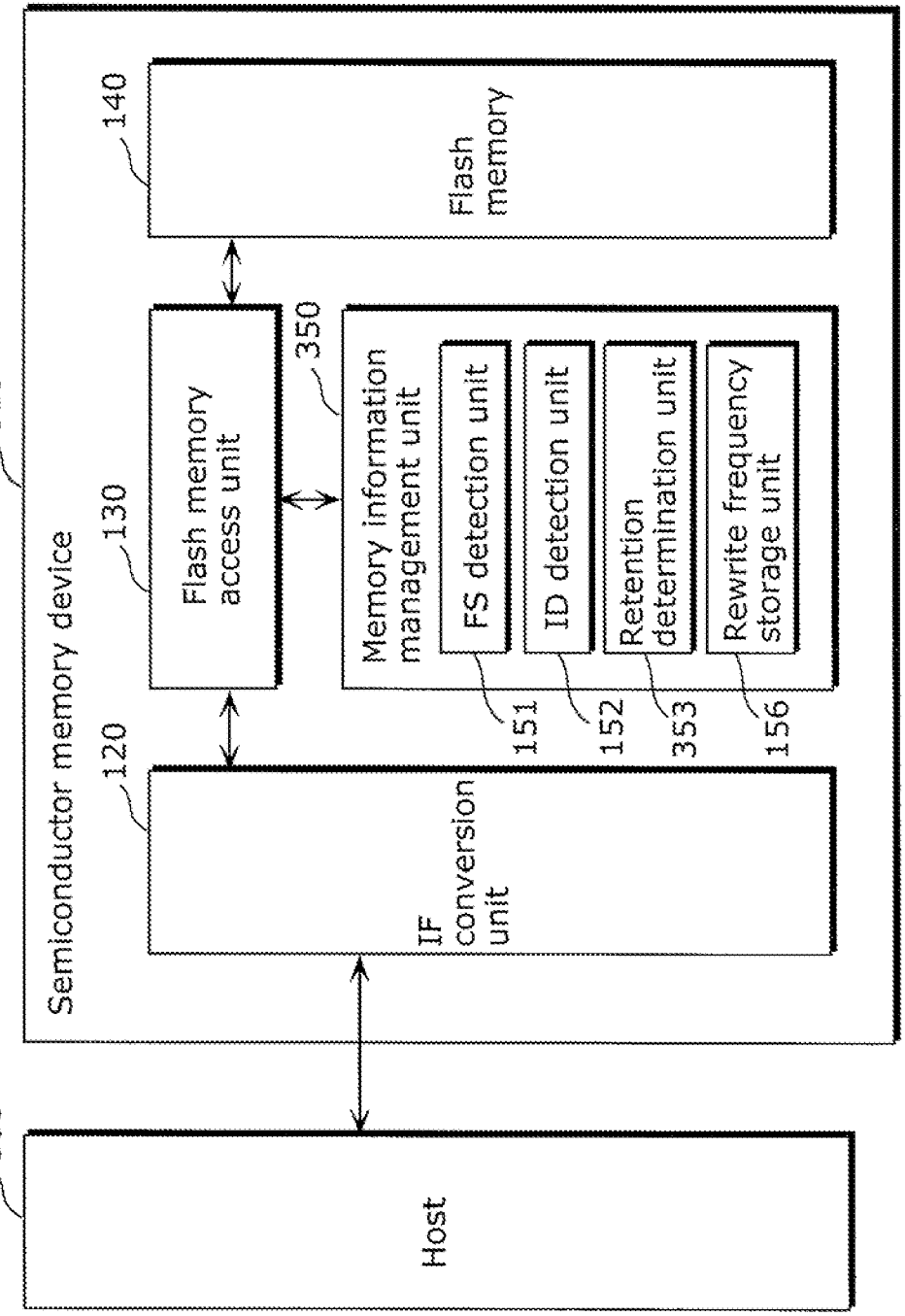

FIG. 9

| BP | Block number | Rewrite frequency | Last write time | Current time |
|---|---|---|---|---|
| 1 | 1 | 400 | 2003/2/1 | 2003/3/1 |
| 2 | 2 | 500 | 2003/2/6 | 2003/3/1 |
| : | : | : | : | : |
| 8 | 8 | 300 | 2002/6/1 | 2003/3/1 |

SEMICONDUCTOR MEMORY DEVICE THAT STORES A REWRITE FREQUENCY OF A NONVOLATILE MEMORY INCLUDED IN THE SEMICONDUCTOR MEMORY DEVICE

BACKGROUND OF THE INVENTION (1) Field of the Invention

The present invention relates to a semiconductor memory device such as a memory card, and a semiconductor memory system including the semiconductor memory device. The present invention especially relates to a technique of preventing decreased endurance reliability caused by performance degradation of a nonvolatile memory in a semiconductor memory device.

(2) Description of the Related Art

Conventionally, a semiconductor memory device such as a Secure Digital (SD) card which is a card-type recording medium including a flash memory is microminiature and super-slim, and is widely used to store data such as images in a digital camera, a mobile appliance, and so on because of its ease of handling.

The flash memory included in such a semiconductor memory device is a nonvolatile memory in which data can be erased and rewritten in units of blocks of a fixed size. One example of the flash memory is a NAND-type flash memory. There are two modes of storing data in the NAND-type flash memory: a Single-Level Cell (SLC) mode of storing two-valued data in a memory cell; and a Multi-Level Cell (MLC) mode of storing data more than two values in a memory cell. In the SLC mode, two voltage levels are associated with 0 and 1, so that two-valued data of one bit is stored per cell. In the MLC mode, for example, four voltage levels are associated with 0, 1, 2, and 3, so that four-valued data is stored per cell.

The following describes a relation between the number of electrons accumulated in a floating gate of a SLC flash memory (hereafter referred to as "flash memory") and a threshold voltage (Vth), with reference to FIG. 13.

FIG. 13 is a diagram showing a structure of one cell of the flash memory. FIG. 13($a$) is a diagram showing an initial state before data is written, where no electron's charge is accumulated. FIG. 13($b$) is a diagram showing a state after data is written, where an electron's charge is accumulated.

As shown in FIGS. 13($a$) and 13($b$), the flash memory has a structure in which N-channel source electrode 1005 and drain electrode 1006 are formed on a P-channel substrate 1007, and a tunnel oxide film 1004, a floating gate 1003, an oxide insulation film 1002, and a control gate 1001 are stacked between the source electrode 1005 and the drain electrode 1006.

Thus, in the flash memory, an electron's charge retaining region called the floating gate 1003 is included in the transistor, unlike a volatile Dynamic Random Access Memory (DRAM). A voltage threshold when a current flows changes according to a state of the electron's charge accumulated in the floating gate 1003, in the flash memory. In the initial state before data is written, no electron's charge is accumulated in the floating gate 1003 as shown in FIG. 13($a$). In the state after data is written, on the other hand, electrons are accumulated in the floating gate 1003 as shown in FIG. 13($b$).

In the flash memory, the voltage (threshold) when a current flows changes according to whether or not electrons are accumulated in the floating gate 1003. In the case of the SLC flash memory that expresses one bit of information per cell, there are two states of the threshold voltage when a current flows according to the amount of electrons. For example, a potential is low when no electron is accumulated as shown in FIG. 13($a$), whereas the potential increases as electrons are accumulated as shown in FIG. 13($b$). Accordingly, electron accumulation can be controlled in two states so as to be within a predetermined potential threshold. This enables one bit of data to be stored in one memory cell.

Moreover, the tunnel oxide film 1004 having an insulation function is used in the flash memory, in order to retain electrons accumulated in the floating gate 1003. Upon writing or erasing data, electrons pass through the tunnel oxide film 1004. This being so, when data is repeatedly rewritten, the tunnel oxide film 1004 degrades due to injection and extraction of electrons. As a result of repeated damage to the tunnel oxide film 1004, the tunnel oxide film 1004 eventually becomes unable to function as an insulator.

Meanwhile, in the MLC mode of storing four-valued data per cell, there are four states of the threshold voltage when a current flows according to the amount of electrons. Since the threshold voltage is controlled not only by whether or not electrons are accumulated but also by the amount of electrons, it is susceptible to a change in electron amount caused by the degradation of the tunnel oxide film 1004 upon rewriting.

Thus, the flash memory has structural characteristics of being limited in rewrite frequency. In view of this, conventionally the rewrite frequency of the flash memory is stored and managed in the semiconductor memory device (for example, see Japanese Unexamined Patent Application Publication No. 2005-284659).

The following describes a conventional method of managing the rewrite frequency of the flash memory, with reference to FIG. 14. FIG. 14 is a diagram showing a structure of a conventional semiconductor memory system.

As shown in FIG. 14, the conventional semiconductor memory system includes a host 1100 such as a Personal Computer (PC), and a semiconductor memory device 1110 such as an SD card that is capable of retaining data in an internal semiconductor memory.

The conventional semiconductor memory device 1110 includes: an interface conversion unit (hereafter referred to as "IF conversion unit") 1120 that receives access from the host 1100; a flash memory 1140 that stores data; a flash memory access unit 1130 that writes data to or reads data from the flash memory 1140; and a memory information management unit 1150 that manages information of the semiconductor memory device 1110. The memory information management unit 1150 includes a rewrite frequency storage unit 1156 that stores a rewrite frequency of the flash memory 1140.

When the semiconductor memory device 1110 receives a data write request from the host 1100, the IF conversion unit 1120 converts it to a write sequence to the flash memory 1140, and writes data to the flash memory 1140. Moreover, the memory information management unit 1150 increments the rewrite frequency stored in the rewrite frequency storage unit 1156.

To check the rewrite frequency, the host 1100 independently issues a request (device unique command) for obtaining the rewrite frequency, to the semiconductor memory device 1110. The IF conversion unit 1120 analyzes the command for obtaining the rewrite frequency, and returns the rewrite frequency stored in the rewrite frequency storage unit 1156 in the memory information management unit 1150 to the host 1100, as a response to the command for obtaining the rewrite frequency.

However, in the above-mentioned structure of the conventional semiconductor memory system, in the case where the type of semiconductor memory device changes such as when an SD card of a new type is produced by a manufacturer, the host needs to independently issue a command for obtaining the rewrite frequency, for each type of semiconductor memory device.

Thus, the conventional semiconductor memory system has a problem that an access method for obtaining the rewrite frequency needs to be changed for each type of semiconductor memory device, and semiconductor memory devices of different types cannot be accessed in a uniform manner.

SUMMARY OF THE INVENTION

The present invention has been made to solve the problem stated above, and has an object of providing a semiconductor memory device and a semiconductor memory system that enable a rewrite frequency to be obtained by a uniform access method regardless of the type of semiconductor memory device.

To solve the stated problem, one aspect of a semiconductor memory device according to the present invention is a semiconductor memory device that stores information, the semiconductor memory device including: a nonvolatile memory that is managed by a predetermined file system having a parameter dependent on the semiconductor memory device; a rewrite frequency storage unit that stores a rewrite frequency of the nonvolatile memory; an identification information detection unit that detects whether or not first identification information is stored in the nonvolatile memory as the parameter, the first identification information being associated with the rewrite frequency; and a management unit that, when the identification information detection unit detects that the first identification information is stored, reflects the rewrite frequency stored in the rewrite frequency storage unit, on a storage area corresponding to the first identification information.

A semiconductor memory device and a semiconductor memory system according to the present invention enable a rewrite frequency to be obtained by a uniform access method regardless of the type of semiconductor memory device.

FURTHER INFORMATION ABOUT TECHNICAL BACKGROUND TO THIS APPLICATION

The disclosure of Japanese Patent Application No. 2010-109797 filed on May 12, 2010 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2A is a diagram showing a structure of OEM parameters in the semiconductor memory device according to the first embodiment;

FIG. 2B is a diagram showing a structure of each of the OEM parameters shown in FIG. 2A;

FIG. 4 is a diagram showing data assignment of an OEM parameter in the semiconductor memory device according to the first embodiment;

FIG. 7 is a block diagram showing a structure of a host in a semiconductor memory system according to a third embodiment of the present invention;

FIG. 8 is a block diagram showing a structure of a semiconductor memory device in the semiconductor memory system according to the third embodiment;

FIG. 9 is a diagram showing data assignment of an OEM parameter in the semiconductor memory device according to the third embodiment;

DESCRIPTION OF THE PREFERRED EMBODIMENT(S)

Figure 1:
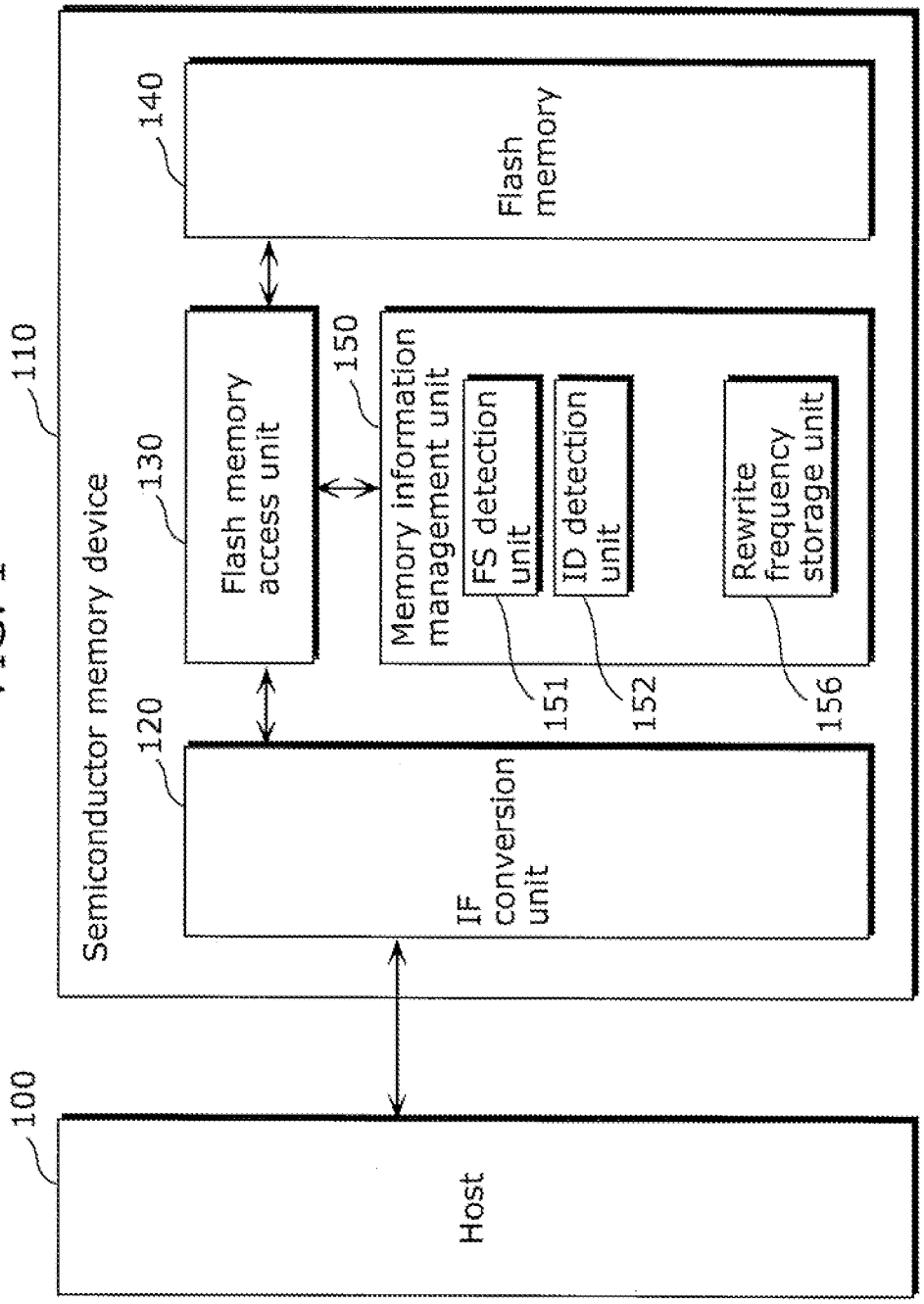
FIG. 1 is a block diagram showing a structure of a semiconductor memory device according to a first embodiment of the present invention.

One aspect of a semiconductor memory device according to the present invention is a semiconductor memory device that stores information, the semiconductor memory device including: a nonvolatile memory that is managed by a predetermined file system having a parameter dependent on the semiconductor memory device; a rewrite frequency storage unit that stores a rewrite frequency of the nonvolatile memory; an identification information detection unit that detects whether or not first identification information is stored in the nonvolatile memory as the parameter, the first identification information being associated with the rewrite frequency; and a management unit that, when the identification information detection unit detects that the first identification information is stored, reflects the rewrite frequency stored in the rewrite frequency storage unit, on a storage area corresponding to the first identification information.

According to this aspect, the first identification information identifying the rewrite frequency of the nonvolatile memory is set using the device dependent parameter in the predetermined file system, and the rewrite frequency stored in the rewrite frequency storage unit is reflected on the value corresponding to the first identification information. Therefore, by referencing the value corresponding to the first identification information, the rewrite frequency of the nonvolatile memory can be obtained regardless of the type of semiconductor memory device.

Moreover, in one aspect of the semiconductor memory device according to the present invention, the storage area corresponding to the first identification information is a storage area in the nonvolatile memory.

Moreover, in one aspect of the semiconductor memory device according to the present invention, the nonvolatile memory is divided into a plurality of blocks, the rewrite frequency storage unit stores, as the rewrite frequency, a rewrite frequency of each of the plurality of blocks, and the identification information detection unit further detects whether or not second identification information is stored in the nonvolatile memory as the parameter, the second identification information indicating that the rewrite frequency of the nonvolatile memory is managed separately for each of the plurality of blocks.

Moreover, in one aspect of the semiconductor memory device according to the present invention, the first identification information is set for each of the plurality of blocks.

Moreover, in one aspect of the semiconductor memory device according to the present invention, the semiconductor memory device further includes: a timer that indicates a time; and a retention determination unit that determines, by referencing the timer, whether or not data stored in the nonvolatile memory is reliable, on the basis of a write time at which writing is performed to the nonvolatile memory and a current time, and the management unit further reflects, when the information is written to the nonvolatile memory, the write time indicated by the timer, on a storage area corresponding to third identification information associated with the write time.

Moreover, in one aspect of the semiconductor memory device according to the present invention, the semiconductor memory device further includes a file system detection unit that detects a format of the predetermined file system.

Moreover, in one aspect of the semiconductor memory device according to the present invention, the predetermined file system is exFAT, and the identification information detection unit detects, when the file system detection unit detects exFAT as the predetermined file system, whether or not the first identification information is stored in the nonvolatile memory.

Moreover, in one aspect of the semiconductor memory device according to the present invention, the nonvolatile memory is a flash memory.

One aspect of a semiconductor memory system according to the present invention is a semiconductor memory system including: a semiconductor memory device that is managed by a predetermined file system and includes a nonvolatile memory; and a host apparatus that includes a memory information update unit that manages information of the semiconductor memory device, wherein the predetermined file system has a parameter dependent on the semiconductor memory device, the memory information update unit includes: a rewrite frequency storage unit that stores a rewrite frequency of the semiconductor memory device; and an identification information detection unit that detects whether or not first identification information is stored in the nonvolatile memory as the parameter, the first identification information being associated with the rewrite frequency, and the memory information update unit reflects, when the identification information detection unit detects that the first identification information is stored, the rewrite frequency stored in the rewrite frequency storage unit, on a storage area corresponding to the first identification information.

According to this aspect, the first identification information identifying the rewrite frequency of the nonvolatile memory is set using the device dependent parameter in the predetermined file system, and the rewrite frequency stored in the rewrite frequency storage unit is reflected on the value corresponding to the first identification information. Therefore, by referencing the value corresponding to the first identification information, the rewrite frequency of the nonvolatile memory can be obtained regardless of the type of semiconductor memory device.

Moreover, in one aspect of the semiconductor memory system according to the present invention, the storage area corresponding to the first identification information is a storage area in the nonvolatile memory.

Moreover, in one aspect of the semiconductor memory system according to the present invention, the nonvolatile memory is divided into a plurality of blocks, the rewrite frequency storage unit stores, as the rewrite frequency, a rewrite frequency of each of the plurality of blocks, and the identification information detection unit further detects whether or not second identification information is stored in the nonvolatile memory as the parameter, the second identification information indicating that the rewrite frequency of the nonvolatile memory is managed separately for each of the plurality of blocks.

Moreover, in one aspect of the semiconductor memory system according to the present invention, the first identification information is set for each of the plurality of blocks.

Moreover, in one aspect of the semiconductor memory system according to the present invention, the memory information update unit further includes: a timer that indicates a time; and a retention determination unit that determines, by referencing the timer, whether or not data stored in the semiconductor memory device is reliable, on the basis of a write time at which writing is performed to the semiconductor memory device and a current time, and the memory information update unit further reflects, when information is written to the semiconductor memory device, the write time indicated by the timer, on a storage area corresponding to third identification information associated with the write time.

Moreover, in one aspect of the semiconductor memory system according to the present invention, one of the memory information update unit and the semiconductor memory device further includes a timer that indicates a time, an other one of the memory information update unit and the semiconductor memory device includes a retention determination unit that determines, by referencing the timer, whether or not data stored in the semiconductor memory device is reliable, on the basis of a write time at which writing is performed to the semiconductor memory device and a current time, and the memory information update unit or the semiconductor memory device reflects, when information is written to the semiconductor memory device, the write time indicated by the timer, on a storage area corresponding to third identification information associated with the write time.

Moreover, in one aspect of the semiconductor memory system according to the present invention, the memory information update unit further includes a file system detection unit that detects a format of the predetermined file system.

Moreover, in one aspect of the semiconductor memory system according to the present invention, the predetermined file system is exFAT, and the identification information detection unit detects, when the file system detection unit detects exFAT as the predetermined file system, whether or not the first identification information is stored in the nonvolatile memory.

Moreover, in one aspect of the semiconductor memory system according to the present invention, the nonvolatile memory is a flash memory.

The following describes a semiconductor memory device and a semiconductor memory system according to embodiments of the present invention, with reference to drawings.

First Embodiment

A semiconductor memory device according to a first embodiment of the present invention is described first, with reference to FIG. 1. FIG. 1 is a block diagram showing a structure of the semiconductor memory device according to the first embodiment.

As shown in FIG. 1, a semiconductor memory device 110 according to the first embodiment is a semiconductor memory device that stores information, and includes an interface conversion unit (IF conversion unit) 120, a flash memory access unit 130, a flash memory 140, and a memory information management unit 150. As an example, the semiconductor memory device 110 is an SD card that is removable from a host 100. The host 100 is a host apparatus such as a PC, and the host 100 and the semiconductor memory device 110 constitute a semiconductor memory system.

The following describes each component of the semiconductor memory device 110 according to this embodiment, in detail.

The IF conversion unit 120 is described first. The IF conversion unit 120 is an interface that receives access from an external apparatus such as the host 100. The IF conversion unit 120 receives a predetermined control command and data from the host 100, or transmits data and the like to the host 100 according to a control command from the host 100.

The IF conversion unit 120 also has a protocol conversion function. The IF conversion unit 120 performs, according to need, protocol conversion on a control command and data received from the host 100, to enable access to the flash memory 140 via the flash memory access unit 130. Thus, the IF conversion unit 120 transfers a control command and data received from the host 100 to the flash memory access unit 130, or receives data and the like transferred from the flash memory access unit 130.

For example, the IF conversion unit 120 receives, from the host 100, a write command and data (write data) to be stored in the flash memory 140, and transfers the write command and the write data to the flash memory access unit 130. The IF conversion unit 120 also receives a read command from the host 100, and transmits data read from the flash memory 140 via the flash memory access unit 130, to the host 100.

The flash memory access unit 130 is described next. The flash memory access unit 130 is a memory access unit having a function of controlling access to the flash memory 140 on the basis of a control command from the host 100, and writes data to the flash memory 140 or reads data stored in the flash memory 140. For example, the flash memory access unit 130 writes data to or reads data from the flash memory 140, according to an address indicated by a write command or a read command from the host 100.

The flash memory access unit 130 also controls access to the memory information management unit 150. The flash memory access unit 130 performs access control between the memory information management unit 150 and the flash memory 140.

For instance, at the end of initialization of the flash memory 140 or according to a command or the like from the host 100, the flash memory access unit 130 instructs a file system detection unit 151 in the memory information management unit 150 to detect a format of a file system managing the flash memory 140, and instructs an ID detection unit 152 in the memory information management unit 150 to detect predetermined identification information (identifier) from the flash memory 140. The flash memory access unit 130 also instructs the memory information management unit 150 to reflect a rewrite frequency stored in a rewrite frequency storage unit 156, on a predetermined storage area in the flash memory 140.

The flash memory 140 is described next. The flash memory 140 is a storage unit for storing data, and is composed of a nonvolatile memory.

The flash memory 140 is managed by a predetermined file system having a parameter that is dependent on the semiconductor memory device 110 (device dependent parameter). Accordingly, a file system identifier for enabling the external apparatus such as the host 100 to identify that the flash memory 140 is managed by the predetermined file system is stored in a predetermined storage area in the flash memory 140. There are a plurality of device dependent parameters, and information (data) as each parameter is stored in a predetermined storage area in the flash memory 140. The user can independently use each parameter, and information (data) as the parameter is defined or updated by the external apparatus such as the host 100. A detailed structure of the parameters will be described later.

Figure 13:
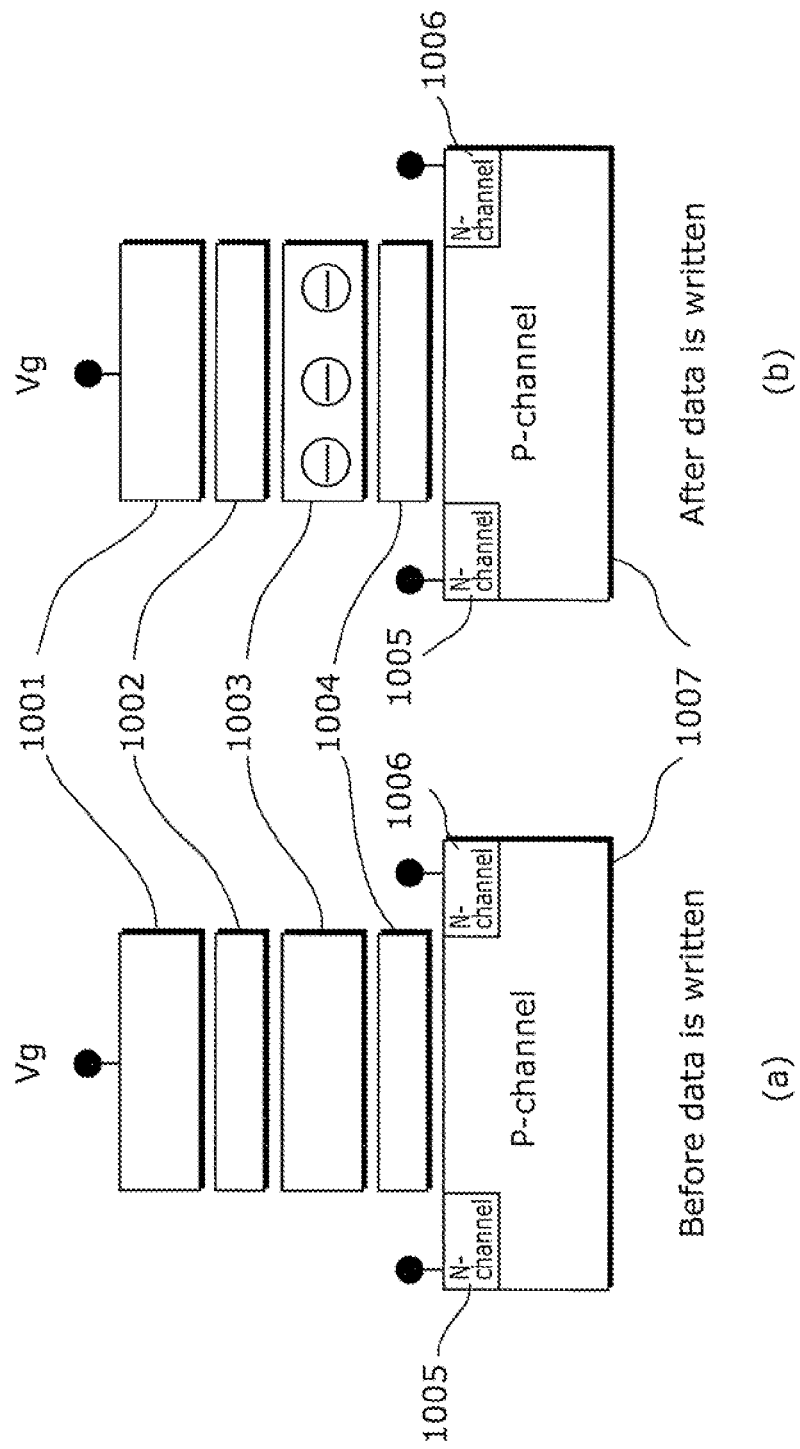
FIG. 13 is a diagram showing a structure of a SLC flash memory.
Figure 14:
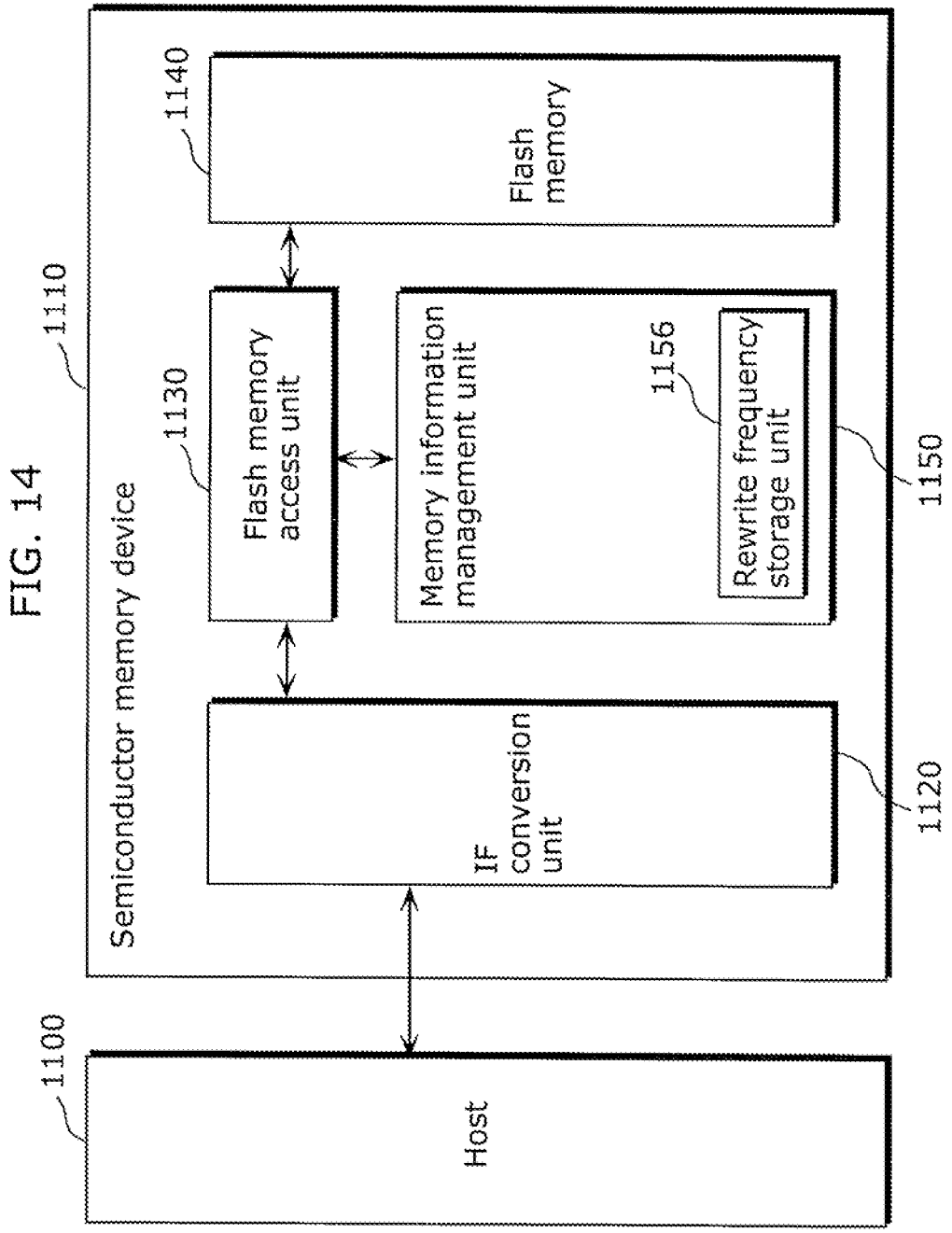
FIG. 14 is a block diagram showing a structure of a conventional semiconductor memory device.

In this embodiment, the flash memory 140 is a SLC flash memory as shown in FIG. 13, and is made up of a plurality of physical blocks that are predetermined storage areas. A physical block is a unit of erasing data, and each physical block is made up of a plurality of pages. A page is a minimum unit (write unit) of storing data by the external apparatus such as the host 100.

The memory information management unit 150 is described next. The memory information management unit 150 has a function of managing information of the semiconductor memory device 110, and includes the rewrite frequency storage unit 156, the file system detection unit (hereafter referred to as "FS detection unit") 151, and the identification (ID) detection unit 152.

The rewrite frequency storage unit 156 has a function of storing a rewrite frequency of the flash memory 140. The number of times (value) writing is performed on the flash memory 140 is stored in the rewrite frequency storage unit 156, as the rewrite frequency.

The rewrite frequency stored in the rewrite frequency storage unit 156 is updated by counting the number of times writing is performed on the flash memory 140. That is, each time writing is performed on a predetermined storage area in the flash memory 140, the rewrite frequency is incremented by one to be updated. In this embodiment, since the flash memory 140 is divided into a plurality of blocks, the rewrite frequency storage unit 156 stores the rewrite frequency for each of the plurality of blocks, as described later. In this case, the rewrite frequency can be obtained by counting the number of times writing is performed on the block in the flash memory 140. Note that the number of times writing is performed can be counted by counting the number of times the block is erased in the flash memory 140.

The FS detection unit 151 has a function of detecting the format of the file system managing the flash memory 140. In this embodiment, the FS detection unit 151 reads predetermined data from the flash memory 140 to detect the format of the file system, and specifies a type of the formatted file system, according to an instruction from the flash memory access unit 130. In the case where the flash memory 140 is managed by the predetermined file system, the identifier identifying the management by the file system is stored in the flash memory 140.

The ID detection unit 152 is an identification information detection unit that detects whether or not first identification information (first identifier) associated with the rewrite frequency of the flash memory 140 is included in the information stored in the flash memory 140, as a device dependent parameter in the predetermined file system. The first identification information is a rewrite frequency identifier indicating that data stored in a storage area corresponding to the first identification information is the number of times writing is performed on the flash memory 140, i.e., the rewrite frequency of the flash memory 140.

In this embodiment, when the FS detection unit 151 detects the file system having device dependent parameters, the ID detection unit 152 searches fields of the parameters in the flash memory 140 to detect whether or not the first identification information identifying the rewrite frequency is stored as a parameter. In the case where the first identification information is stored, the ID detection unit 152 detects the first identification information. That is, the ID detection unit 152 detects whether or not the first identification information is present in a storage area for the device dependent parameters in the flash memory 140.

The memory information management unit 150 reflects the rewrite frequency stored in the rewrite frequency storage unit 156, on the storage area corresponding to the first identification information, when the ID detection unit 152 detects that the first identification information is stored in the flash memory 140. In this embodiment, the storage area corresponding to the first identification information is the storage area for the parameters in the flash memory 140. Accordingly, the memory information management unit 150 updates the value of the rewrite frequency (the value corresponding to the first identification information) stored in the storage area of the flash memory 140, by overwriting it with the value of the rewrite frequency stored in the rewrite frequency storage unit 156.

Though the memory information management unit 150 reflects the rewrite frequency stored in the rewrite frequency storage unit 156 on the flash memory 140 in this embodiment, the reflection may be performed by a management unit other than the memory information management unit 150.

In the following description of this embodiment, Extended FAT (hereafter referred to as "ex FAT") which is a file system developed by Microsoft Corporation for flash memories is used as a specific example of the device dependent file system. The exFAT file system is independent of an OS or a CPU of a PC and the like, and has device dependent parameters (OEM parameters) that are definable by an OEM so that the OEM can independently design the file system of the device (semiconductor memory device). The OEM parameters can be stored in the flash memory 140 as data that is not erased except in a specific condition, upon initialization of the file system.

The OEM parameters which are device dependent parameters are described below, with reference to FIG. 2A. FIG. 2A is a diagram showing a structure of the OEM parameters in the semiconductor memory device according to the first embodiment. In FIG. 2A, the columns from left to right represent a byte position (BP), a byte length (Length), a name (Field Name), and description (Contents), respectively.

The OEM parameters are set using a storage area of a fixed address in the flash memory 140, the storage area being managed by exFAT. In this embodiment, ten sets of data from Parameters[0] to Parameters[9] are managed in the flash memory 140, as shown in FIG. 2A. That is, up to ten sets of data can be registered using ten OEM parameters in this embodiment. Note that each OEM parameter has a byte length of 48 bytes.

A structure of each of the ten OEM parameters shown in FIG. 2A is described below, with reference to FIG. 2B. FIG. 2B is a diagram showing a structure of each OEM parameter in FIG. 2A.

As shown in FIG. 2B, each parameter is made up of "ParametersGuid" and "CustomDefined". "ParametersGuid" is a type of parameter the user can independently assign and register as a Globally Unique Identifier (hereafter referred to as "GUID"). "CustomDefined" is a type of parameter the user can independently define for each GUID.

In this embodiment, in one of the OEM parameters, a GUID identifying the rewrite frequency of the flash memory 140 is assigned as the first identification information associated with the rewrite frequency, and also the "CustomDefined" field is assigned as a storage area for managing the rewrite frequency value corresponding to the GUID identifying the rewrite frequency.

In detail, in the OEM-parameter-related storage area managed by exFAT in the flash memory 140, the GUID identifying the rewrite frequency is defined and stored in a storage area corresponding to "ParametersGuid", and the rewrite frequency value equivalent to the actual rewrite frequency of the flash memory 140 is stored in a storage area corresponding to "CustomDefined".

Note that, once the GUID identifying the rewrite frequency is stored in "ParametersGuid" as one GUID, this GUID identifying the rewrite frequency is unchanged. On the other hand, the rewrite frequency value stored in "CustomDefined" is updated according to the rewrite frequency of the flash memory 140, as described later. Such assignment of an OEM parameter can be performed by the external apparatus of the semiconductor memory device 110, such as the host 100.

Figure 3A:
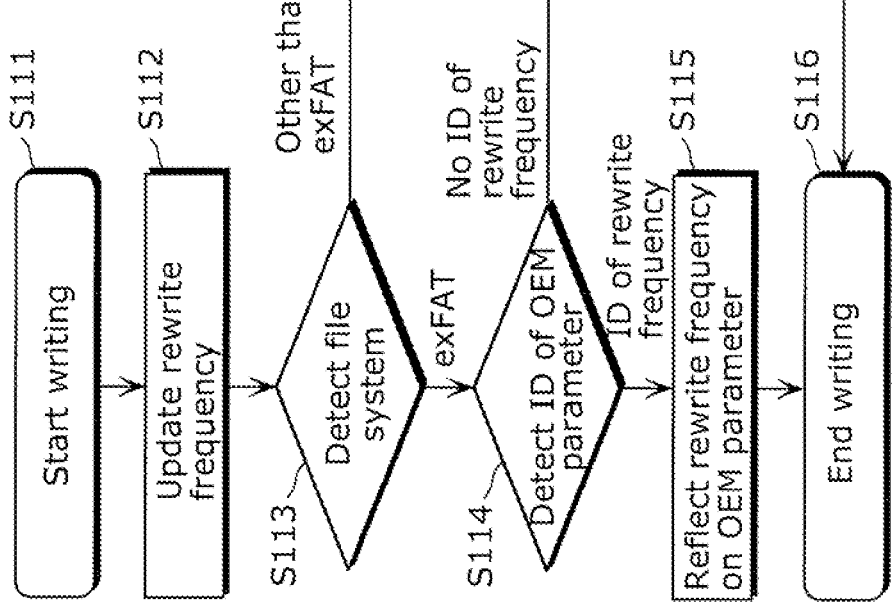
FIG. 3A is a flowchart in the case of initializing the semiconductor memory device according to the first embodiment.
Figure 3B:
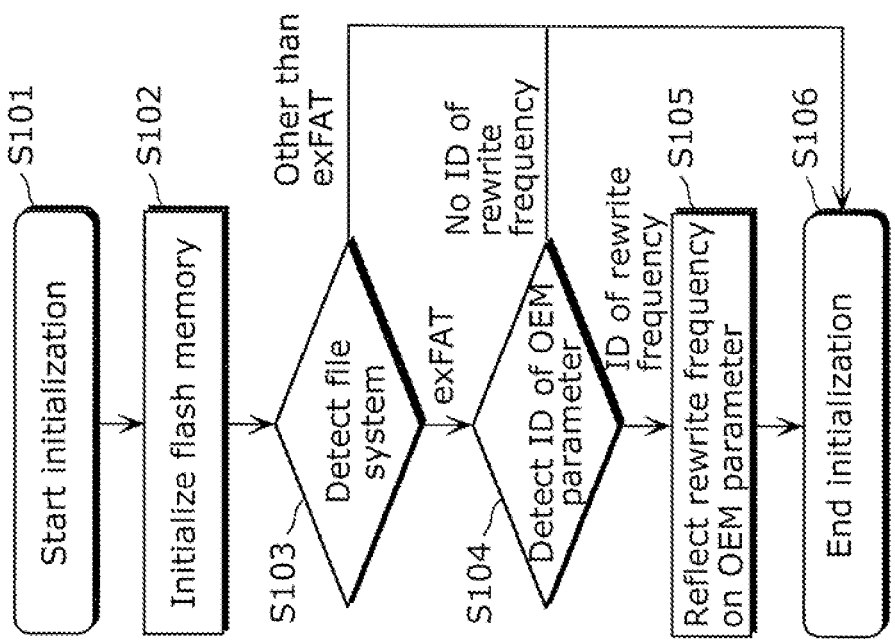
FIG. 3B is a flowchart in the case of writing data to the semiconductor memory device according to the first embodiment.

The following describes an operational process of the semiconductor memory device 110 according to the first embodiment, with reference to FIGS. 3A and 3B. FIG. 3A is a flowchart showing a process flow in the case of initializing the semiconductor memory device 110 according to the first embodiment. FIG. 3B is a flowchart showing a process flow in the case of writing data to the semiconductor memory device 110 according to the first embodiment.

The initialization process flow of the semiconductor memory device 110 according to this embodiment is described first, with reference to FIG. 3A.

As shown in FIG. 3A, the semiconductor memory device 110 starts initialization, when triggered by power-on of the semiconductor memory device 110, a reset signal, or the like (Step S101).

First, the flash memory access unit 130 initializes the flash memory 140, to enable data to be written to or read from the flash memory 140 (Step S102).

Next, the FS detection unit 151 detects the format of the file system managing the flash memory 140 (Step S103).

In detail, according to an instruction from the flash memory access unit 130, the FS detection unit 151 reads predetermined data from the flash memory 140 via the flash memory access unit 130 to detect the format of the file system managing the flash memory 140, and specifies the type of the formatted file system.

When the type of the file system is other than exFAT in Step S103, the process goes to an initialization end step (Step S106). When the type of the file system is exFAT, the process goes to the next step (Step S104).

In this embodiment, the identifier indicating that the flash memory 140 is managed by exFAT is stored in the flash memory 140 in the semiconductor memory device 110. Accordingly, in Step S103, this identifier is read from the flash memory 140 as the predetermined data, and exFAT is detected as the type of the file system managing the flash memory 140.

When the FS detection unit 151 detects exFAT as the file system of the flash memory 140 in Step S103, the ID detection unit 152 sequentially searches all OEM parameter fields (Parameters[0] to [9]) in the flash memory 140 via the flash memory access unit 130, to detect whether or not the GUID (first identification information) identifying the rewrite frequency already registered by the host 100 is present in the "ParametersGuid" field. When the GUID identifying the rewrite frequency is present, the ID detection unit 152 detects the GUID identifying the rewrite frequency (Step S104).

In detail, the ID detection unit 152 sequentially reads data stored in all OEM parameter fields in the flash memory 140, and detects whether or not the GUID identifying the rewrite frequency is included in the read data.

When the GUID identifying the rewrite frequency is not present in Step S104, the process goes to the initialization end step (Step S106). When the GUID identifying the rewrite frequency is present, the process goes to the next step (Step S105).

When the GUID identifying the rewrite frequency is detected in Step S104, the memory information management unit 150 reflects the rewrite frequency stored in the rewrite frequency storage unit 156, on the "Custom Defined" field of the OEM parameter in the flash memory 140 via the flash memory access unit 130 (Step S105).

Thus, the rewrite frequency data (value) stored in "CustomDefined" of the OEM parameter in the flash memory 140 is updated using the rewrite frequency data (value) stored in the rewrite frequency storage unit 156. In other words, the rewrite frequency value corresponding to the GUID identifying the rewrite frequency is changed to the rewrite frequency value stored in the rewrite frequency storage unit 156.

The process then goes to the initialization end step (Step S106), where the initialization ends.

By initializing the semiconductor memory device 110 in this way, access to the flash memory 140 is handled as follows. When the host 100 issues an access request to the flash memory 140, the protocol with the host 100 is converted by the IF conversion unit 120, and the flash memory 140 is accessed via the flash memory access unit 130. In the case where the access request from the host 100 is a request to access an area where the GUID identifying the rewrite frequency is defined in the OEM parameter, the rewrite frequency managed in the semiconductor memory device 110 is notified to the host 100 as OEM parameter information.

For example, when the host 100 issues a command for obtaining the rewrite frequency of the flash memory 140 to the semiconductor memory device 110 in order to check the rewrite frequency of the flash memory 140, the flash memory access unit 130 in the semiconductor memory device 110 reads the rewrite frequency data corresponding to the GUID identifying the rewrite frequency from the OEM parameter storage area in the flash memory 140, and notifies the rewrite frequency data to the host 100 via the IF conversion unit 120.

The writing process flow in the case of writing data to the semiconductor memory device 110 is described next, with reference to FIG. 3B.

In the semiconductor memory device 110 according to this embodiment, the rewrite frequency of the flash memory 140 is managed by using exFAT as the file system having device dependent parameters (OEM parameters). In this embodiment, such management is performed by reflecting the rewrite frequency data stored in the rewrite frequency storage unit 156, on the "CustomDefined" field in the OEM parameter.

An example of reflecting the rewrite frequency of the flash memory 140 on the "CustomDefined" field in the OEM parameter is described in detail below, with reference to FIG. 4. FIG. 4 is diagram showing data assignment of an OEM parameter in the semiconductor memory device according to the first embodiment. Note that an example of dividing the whole area of the flash memory 140 into eight blocks and managing the rewrite frequency of each block is shown in FIG. 4.

In this embodiment, the flash memory 140 is divided into a plurality of blocks. For instance, the flash memory 140 may be divided into eight blocks, as shown in FIG. 4. The rewrite frequencies of the eight blocks in the flash memory 140 are managed using the first eight "CustomDefined" fields (BP1 to 8 of Generic Parameters Template) shown in FIGS. 2A and 2B.

As shown in FIG. 4, a block number and a BP correspond to each other for each of the eight blocks in the flash memory 140, where a number of the BP shows the corresponding block number. For example, the BP number 1 corresponds to the block number 1, and the BP number 2 corresponds to the block number 2. Moreover, the rewrite frequencies of the eight blocks are managed in units of block numbers. FIG. 4 shows the case where the rewrite frequency of the block managed by the block number 1 is 400, and the rewrite frequency of the block managed by the block number 2 is 500.

The writing process flow in the case of writing data to the flash memory 140 is described below, with reference to FIG. 3B.

First, the semiconductor memory device 110 receives a write command from the host 100 as an access request to the flash memory 140. Hence, writing to the flash memory 140 starts (Step S111).

The IF conversion unit 120 converts the protocol with the host 100 in the write command, and the flash memory access unit 130 performs writing to the flash memory 140. When writing to the flash memory 140, the memory information management unit 150 updates the rewrite frequency of the flash memory 140 stored in the rewrite frequency storage unit 156 (Step S112).

In detail, the memory information management unit 150 updates a rewrite frequency of a block of the flash memory 140 to which writing is performed, on the basis of an address accessed by the flash memory access unit 130. In this embodiment, the flash memory 140 is managed separately in eight blocks as mentioned earlier, and so the rewrite frequency storage unit 156 stores the rewrite frequency for each of the eight blocks. Note that the rewrite frequency may be stored separately in a plurality of blocks in the rewrite frequency storage unit 156, too, or the rewrite frequency may be stored not separately in the plurality of blocks in the rewrite frequency storage unit 156.

Next, the FS detection unit 151 detects the format of the file system managing the flash memory 140 (Step S113).

In detail, according to an instruction from the flash memory access unit 130, the FS detection unit 151 reads predetermined data from the flash memory 140 to detect the format of the file system managing the flash memory 140, and specifies the type of the formatted file system.

When the type of the file system is other than exFAT in Step S113, the process goes to a writing end step (Step S116). When the type of the file system is exFAT, the process goes to the next step (Step S114).

The operation in Step S114 is the same as the operation in Step S104 in FIG. 3A. In detail, when the FS detection unit 151 detects exFAT as the file system of the flash memory 140 in Step S113, the ID detection unit 152 sequentially searches all OEM parameter fields in the flash memory 140 via the flash memory access unit 130, to detect whether or not the GUID identifying the rewrite frequency is present in the flash memory 140 as an OEM parameter. When the GUID identifying the rewrite frequency is present, the ID detection unit 152 detects the GUID identifying the rewrite frequency (Step S114).

When the GUID identifying the rewrite frequency is not present in Step S114, the process goes to the writing end step (Step S116). When the GUID identifying the rewrite frequency is present, the process goes to the next step (Step S115).

When the GUID identifying the rewrite frequency is detected in Step S114, the memory information management unit 150 reflects the rewrite frequency data stored in the rewrite frequency storage unit 156, on the "CustomDefined" field of the OEM parameter in the flash memory 140 via the flash memory access unit 130 (Step S115).

Thus, the rewrite frequency data stored in the storage area of the OEM parameter in the flash memory 140 is updated using the rewrite frequency data stored in the rewrite frequency storage unit 156. In other words, the rewrite frequency value corresponding to the GUID identifying the rewrite frequency is changed to the rewrite frequency value stored in the rewrite frequency storage unit 156.

The process then goes to the writing end step (Step S116), where the writing ends.

When, for example, subsequently checking the rewrite frequency of the flash memory 140, the host 100 issues the command for obtaining the rewrite frequency of the flash memory 140 to the semiconductor memory device 110, in the same way as above. Upon receiving the command for obtaining the rewrite frequency of the flash memory 140 from the host 100, the semiconductor memory device 110 reads the rewrite frequency data corresponding to the GUID identifying the rewrite frequency from the storage area of the OEM parameter in the flash memory 140 via the flash memory access unit 130, and notifies the rewrite frequency data to the host 100 via the IF conversion unit 120.

As described above, with the semiconductor memory device 110 according to the first embodiment, when the file system of the semiconductor memory device 110 is a specific file system having device dependent parameters such as exFAT, device-specific information can be obtained by a uniform access method through the use of the file system function of the host 100, without specifying the type of the semiconductor memory device 110.

In the first embodiment, the first identification information identifying the rewrite frequency of the flash memory 140 is set using the device dependent parameter in exFAT, and the rewrite frequency stored in the rewrite frequency storage unit 156 is reflected on the value corresponding to the first identification information. Therefore, by reading and referencing the rewrite frequency value corresponding to the first identification information, the rewrite frequency of the flash memory 140 can be obtained by a uniform access method, regardless of the type of the semiconductor memory device 110.

Moreover, in the first embodiment, the flash memory 140 is managed separately in the plurality of blocks, as mentioned earlier. In this case, it is preferable that second identification information (second identifier) indicating that the rewrite frequency of the flash memory 140 is managed separately for each of the plurality of blocks is stored in the flash memory 140 as an OEM parameter. For instance, a GUID indicating that the rewrite frequency is managed separately for each of the plurality of blocks may be set as the second identification information.

Further, in the case where the flash memory 140 is divided into the plurality of blocks, it is preferable that the ID detection unit 152 detects whether or not the second identification information is stored in the flash memory 140 as an OEM parameter and, when the second identification information is stored, detects the second identification information. When detecting that the second identification information is stored, the rewrite frequency of each block of the flash memory 140 in the rewrite frequency storage unit 156 is reflected on a predetermined storage area in an OEM parameter of the corresponding block in the flash memory 140.

In the case where the flash memory 140 is divided into the plurality of blocks, it is preferable that the GUID (first identification information) identifying the rewrite frequency is set for each of the plurality of blocks in the flash memory 140. For example, when the flash memory 140 is divided into eight blocks as shown in FIG. 4, it is preferable to set eight GUIDs (first identification information) identifying the rewrite frequency.

The first embodiment describes the case where the rewrite frequency data corresponding to the GUID (first identification information) identifying the rewrite frequency is stored in the predetermined storage area of the flash memory 140 as a device dependent OEM parameter, together with the GUID identifying the rewrite frequency. However, this is not a limit for the present invention.

For instance, the rewrite frequency data corresponding to the GUID (first identification information) identifying the rewrite frequency may be stored in a storage area in the flash memory 140 other than the storage area managed by exFAT, or a storage area in the semiconductor memory device 110 other than the flash memory 140, such as the memory information management unit 150. In this case, when detecting that the GUID (first identification information) identifying the rewrite frequency is present in the storage area of the flash memory 140 as a device dependent parameter, the rewrite frequency stored in the rewrite frequency storage unit 156 is reflected on the above-mentioned other storage area.

In such a case, too, the data stored in the other storage area corresponds to the GUID (first identification information) identifying the rewrite frequency. Therefore, by reading the rewrite frequency data corresponding to the first identification information, the rewrite frequency of the flash memory 140 can be obtained by a uniform access method, regardless of the type of the semiconductor memory device 110. Note that a dedicated driver may be provided to achieve this process. As an example, in the case where the storage area on which the rewrite frequency stored in the rewrite frequency storage unit 156 is reflected is included in the memory information management unit 150, the dedicated driver may be provided in the memory information management unit 150.

Second Embodiment

Figure 5:
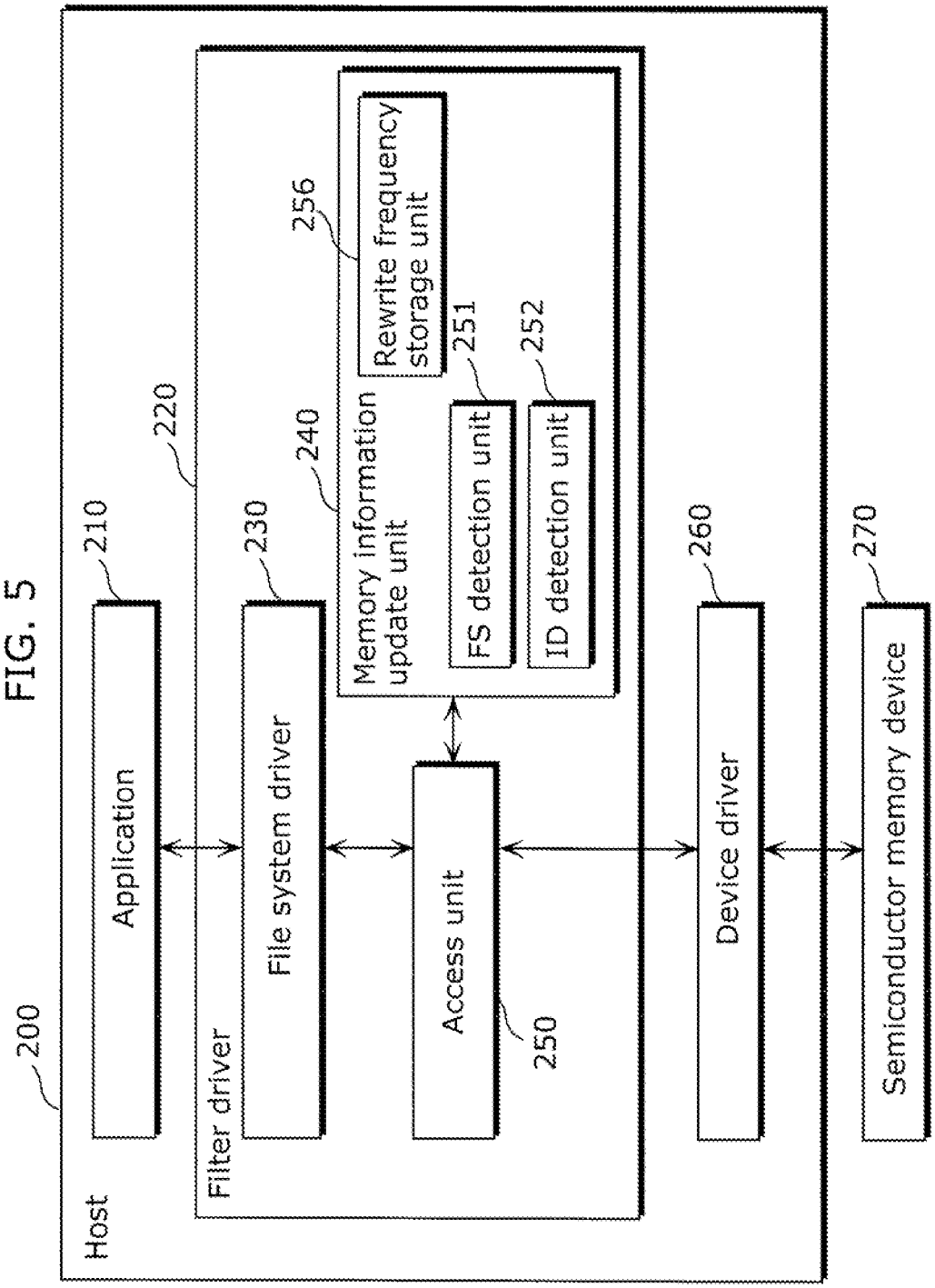
FIG. 5 is a block diagram showing a structure of a semiconductor memory system according to a second embodiment of the present invention.

A second embodiment of the present invention is described below, with reference to FIG. 5. FIG. 5 is a block diagram showing a structure of a semiconductor memory system according to the second embodiment.

As shown in FIG. 5, the semiconductor memory system according to the second embodiment includes a host 200 and a semiconductor memory device 270, where the host 200 accesses the semiconductor memory device 270.

The host 200 is a PC, a video camera that uses the semiconductor memory device 270 as a recording medium, or the like. In this embodiment, the host 200 is assumed to be a PC.

The semiconductor memory device 270 is an SD card or the like removable from the host 200, and has a flash memory of the same structure as in the first embodiment. That is, the flash memory of the semiconductor memory device 270 is managed by the exFAT file system having OEM parameters, and the GUID identifying the rewrite frequency of the flash memory and the rewrite frequency value corresponding to the GUID are assigned as an OEM parameter.

In this embodiment, the host 200 includes: an application 210 that realizes the function of the host 200; a device driver 260 that controls, by software, hardware for physically controlling the semiconductor memory device 270; and a filter driver 220 that performs an intermediate process between the application 210 and the device driver 260.

The filter driver 220 includes: a file system driver 230 that manages data stored in the semiconductor memory device 270 as files; an access unit 250 that instructs to perform a process such as a data write or read on the semiconductor memory device 270 via the device driver 260; and a memory information update unit 240.

The memory information update unit 240 has the same function as the memory information management unit 150 according to the first embodiment, and includes a FS detection unit 251, an ID detection unit 252, and a rewrite frequency storage unit 256.

The FS detection unit 251, the ID detection unit 252, and the rewrite frequency storage unit 256 respectively have the same functions as the FS detection unit 151, the ID detection unit 252, and the rewrite frequency storage unit 256 according to the first embodiment, and so their description is omitted.

Figure 6B:
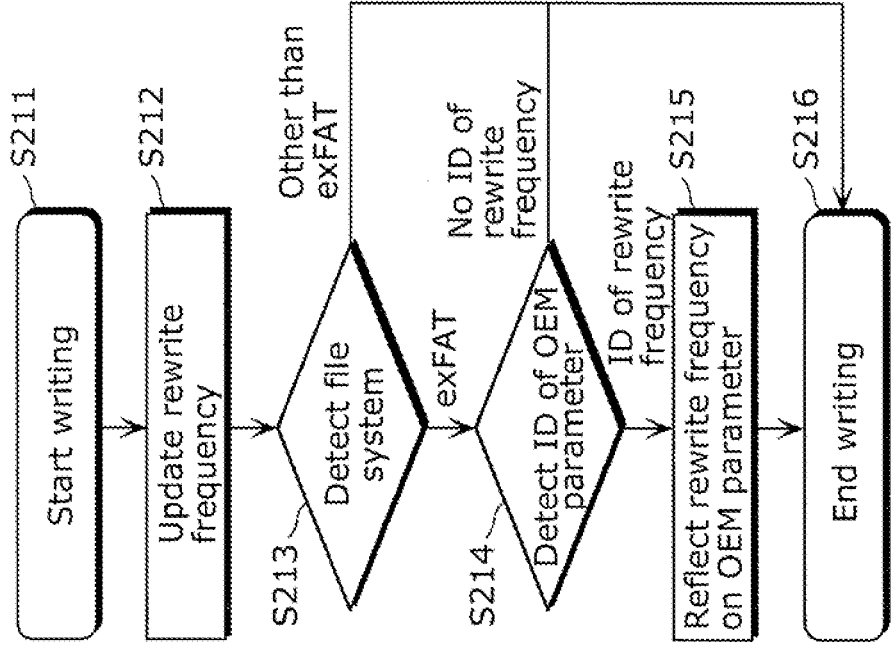
FIG. 6B is a flowchart in the case of writing data to the semiconductor memory device in the semiconductor memory system according to the second embodiment.
Figure 6A:
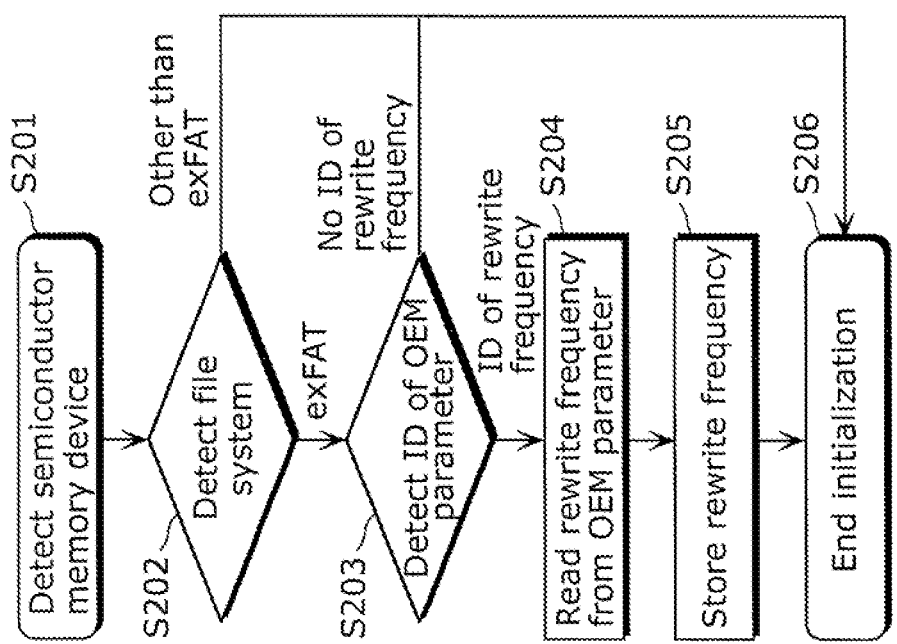
FIG. 6A is a flowchart in the case of initializing a semiconductor memory device in the semiconductor memory system according to the second embodiment.

The following describes an operational process of the semiconductor memory system according to the second embodiment, with reference to FIGS. 6A and 6B. FIG. 6A is a flowchart showing a process flow in the case where the host 200 initializes the semiconductor memory device 270 upon detecting the semiconductor memory device 270, according to the second embodiment. FIG. 6B is a flowchart showing a process flow in the case where the host 200 writes data to the semiconductor memory device 270, according to the second embodiment.

The initialization process flow according to this embodiment is described first, with reference to FIG. 6A.

As shown in FIG. 6A, the host 200 starts the process upon detecting the semiconductor memory device 270 (Step S201).

For example, when the semiconductor memory device 270 is connected to the host 200, the host 200 detects the semiconductor memory device 270, and executes the following process.

The FS detection unit 251 detects the format of the file system managing the flash memory in the semiconductor memory device 270 (Step S202).

The operation in Step 202 is the same as the operation in Step S103 in the first embodiment. In detail, the FS detection unit 251 accesses the detected semiconductor memory device 270 to detect the format of the file system managing the flash memory, and specifies the type of the formatted file system.

When the type of the file system is other than exFAT in Step S202, the process goes to an initialization end step (Step S206). When the type of the file system is exFAT, the process goes to the next step (Step S203).

The operation in Step S203 is the same as the operation in Step S104 in the first embodiment. In detail, when the FS detection unit 251 detects exFAT as the file system of the flash memory in Step S202, the ID detection unit 252 searches all OEM parameter fields in the flash memory, to detect whether or not the GUID identifying the rewrite frequency is present. When the GUID identifying the rewrite frequency is present, the ID detection unit 252 detects the GUID identifying the rewrite frequency (Step S203).

When the GUID identifying the rewrite frequency is not present in Step S203, the process goes to the initialization end step (Step S206). When the GUID identifying the rewrite frequency is present, the process goes to the next step (Step S204).

When the GUID identifying the rewrite frequency is detected in Step S203, the memory information update unit 240 reads the rewrite frequency corresponding to the GUID identifying the rewrite frequency from the semiconductor memory device 270, through OEM parameter reading. The memory information update unit 240 thus obtains the rewrite frequency of the flash memory (Step S204).

The memory information update unit 240 stores the read rewrite frequency in the rewrite frequency storage unit 256 (Step S205). In this way, the rewrite frequency of the flash memory in the specific semiconductor memory device 270 detected by the host 200 can be obtained.

Subsequently, the process goes to the initialization end step (Step S206), where the initialization ends.

The writing process flow in the case where the host 200 writes data to the semiconductor memory device 270 is described next, with reference to FIG. 6B.

The operations in Steps S211 to S216 in FIG. 6B are basically the same as the operations in Steps S111 to S116 in the first embodiment shown in FIG. 3B.

In this embodiment, however, Step S215 differs from Step S115 in the first embodiment. In Step S215, the memory information update unit 240 reflects, as predetermined OEM parameter information in the flash memory in the semiconductor memory device 270, the rewrite frequency data stored in the rewrite frequency storage unit 256, via the access unit 250 and the device driver 260. The writing process flow according to this embodiment is described in detail below.

First, the host 200 transmits, to the semiconductor memory device 270, a write command to the flash memory. Hence, writing to the flash memory in the semiconductor memory device 270 starts (Step S211).

Here, when writing to the flash memory, the memory information update unit 240 updates the rewrite frequency stored in the rewrite frequency storage unit 256 (Step S212).

Next, the FS detection unit 251 detects the format of the file system managing the flash memory (Step S213).

In detail, the FS detection unit 251 reads predetermined data from the flash memory to detect the format of the file system managing the flash memory, and specifies the type of the formatted file system.

When the type of the file system is other than exFAT in Step S213, the process goes to a writing end step (Step S216). When the type of the file system is exFAT, the process goes to the next step (Step S214).

When the FS detection unit 251 detects exFAT as the file system of the flash memory in Step S213, the ID detection unit 252 searches all OEM parameter fields to detect whether or not the GUID identifying the rewrite frequency is present among the OEM parameters. When the GUID identifying the rewrite frequency is present, the ID detection unit 252 detects the GUID identifying the rewrite frequency (Step S214).

When the GUID identifying the rewrite frequency is not present in Step S214, the process goes to the writing end step (Step S216). When the GUID identifying the rewrite frequency is present, the process goes to the next step (Step S215).

When the GUID identifying the rewrite frequency is detected in Step S214, the memory information update unit 240 reflects the rewrite frequency data stored in the rewrite frequency storage unit 256, on the OEM parameter in the flash memory in the semiconductor memory device 270 (Step S215).

Thus, the rewrite frequency data stored in the flash memory is updated using the rewrite frequency data stored in the rewrite frequency storage unit 256. In other words, the rewrite frequency value corresponding to the GUID identifying the rewrite frequency is changed to the rewrite frequency value stored in the rewrite frequency storage unit 256.

The process then goes to the writing end step (Step S216), where the writing ends.

As described above, in the semiconductor memory system according to the second embodiment, when the file system managing the semiconductor memory device 270 is a specific file system having device dependent parameters such as exFAT, device-specific information can be obtained by a uniform access method merely by the operation of the host 200 through the use of the file system function of the host 200, without specifying the type of the semiconductor memory device 270.

In the second embodiment, the first identification information identifying the rewrite frequency of the flash memory is set using the device dependent parameter in exFAT, and the rewrite frequency stored in the rewrite frequency storage unit 256 is reflected on the value corresponding to the first identification information, as in the first embodiment. Therefore, by reading and referencing the rewrite frequency value corresponding to the first identification information, the rewrite frequency of the flash memory can be obtained by a uniform access method, regardless of the type of the semiconductor memory device 270.

Note that the semiconductor memory device 110 in the first embodiment may be used as the semiconductor memory device 270 in the second embodiment. In this case, however, it is preferable that the reflection of the rewrite frequency on the flash memory in the semiconductor memory device is performed by only one of the host and the semiconductor memory device, to avoid overlapping operations between the host and the semiconductor memory device.

The second embodiment describes the case where, each time data is written to the flash memory in the semiconductor memory device 270, the rewrite frequency stored in the rewrite frequency storage unit 256 is reflected on the rewrite frequency in the OEM parameter in the semiconductor memory device 270. However, the present invention is not limited to this. For example, while the rewrite frequency in the rewrite frequency storage unit 256 in the host 200 is updated each time data is written to the flash memory in the semiconductor memory device 270, the rewrite frequency may be reflected on the OEM parameter in the semiconductor memory device 270 each time several writes are performed, or at a predetermined time interval. Alternatively, the rewrite frequency may be reflected on the OEM parameter, upon stopping power supply to the semiconductor memory device 270 or disconnecting the semiconductor memory device 270 from the host 200.

Third Embodiment

A third embodiment of the present invention is described below, with reference to FIGS. 7 to 12.

A structure of a host in a semiconductor memory system according to the third embodiment is described first, with reference to FIG. 7. FIG. 7 is a block diagram showing a structure of the host in the semiconductor memory system according to the third embodiment. In FIG. 7, the same components as those shown in FIG. 5 are given the same reference numerals, and their description is omitted.

As shown in FIG. 7, a host 300 according to this embodiment differs from the host 200 according to the second embodiment, in the structure of the memory information update unit. In this embodiment, a memory information update unit 340 in the host 300 includes a timer 301 that indicates a current time and also indicates a data write time.

A structure of a semiconductor memory device in the semiconductor memory system according to the third embodiment is described next, with reference to FIG. 8. FIG. 8 is a block diagram showing the structure of the semiconductor memory device in the semiconductor memory system according to the third embodiment. In FIG. 8, the same components as those shown in FIG. 1 are given the same reference numerals, and their description is omitted.

As shown in FIG. 8, a semiconductor memory device 310 according to this embodiment differs from the semiconductor memory device 110 according to the first embodiment, in the structure of the memory information management unit. In this embodiment, a memory information management unit 350 in the semiconductor memory device 310 includes a retention determination unit 353 that determines whether or not data stored in the semiconductor memory device 310 is reliable, on the basis of the write time at which writing is performed to the semiconductor memory device 310 and the current time.

The retention determination unit 353 has a function of, by referencing the timer 301, determining whether or not data stored in the flash memory 140 is reliable, on the basis of the data write time to the flash memory 140 in the semiconductor memory device 310 and the current time. The retention determination unit 353 determines whether or not the data stored in the flash memory 140 exceeds a data retainable period.

The following describes data assignment of an OEM parameter in the semiconductor memory device 310 according to the third embodiment, with reference to FIG. 9. FIG. 9 is a diagram showing data assignment of an OEM parameter in the semiconductor memory device 310 according to the third embodiment. As in the first embodiment, an example of reflecting the rewrite frequencies of the eight blocks in the flash memory 140 on the eight "CustomDefined" fields of the OEM parameter is shown in this embodiment.

As shown in FIG. 9, the eight blocks in the flash memory 140 have a last write time and a current time in addition to the BP, the block number, and the rewrite frequency, in this embodiment. The last write time and the current time are managed in each block. In this embodiment, the management is performed by setting last write year/month/day at which data is written last as the last write time, and setting current year/month/day as the current time, as shown in FIG. 9. This enables an elapsed time from the last write day to be managed with accuracy of the number of days. However, the last write time and the current time are not limited to year/month/day, and may instead be a time of day, or a combination of year/month/day and a time of day. That is, the last write time is time information showing a timing at which data is written last, and the current time is current time information.

Figure 10B:
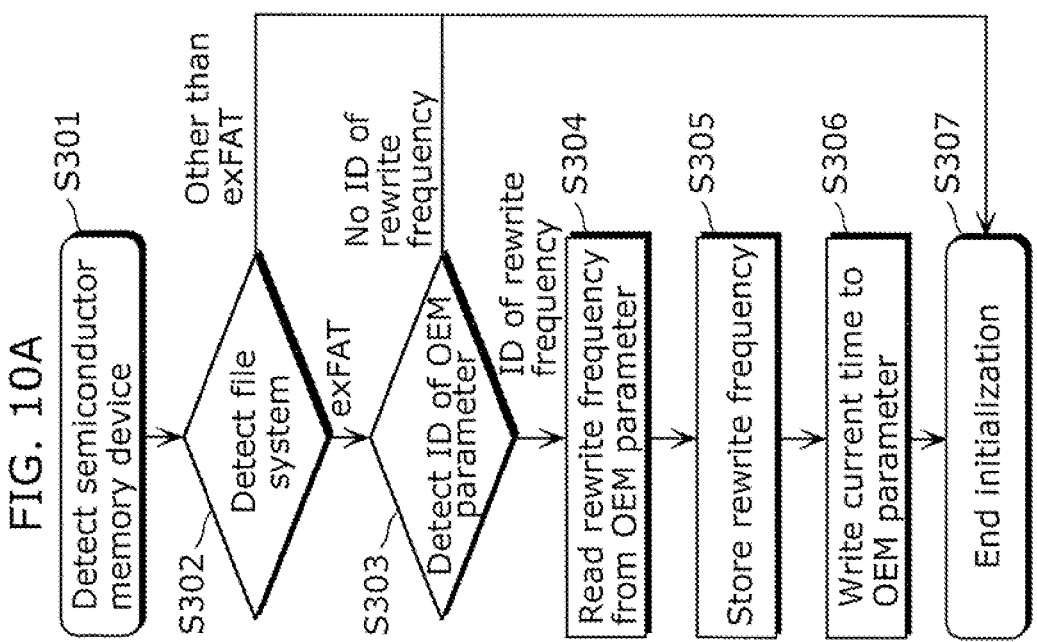
FIG. 10B is a flowchart in the case of writing data to the semiconductor memory device in the semiconductor memory system according to the third embodiment.
Figure 10A:
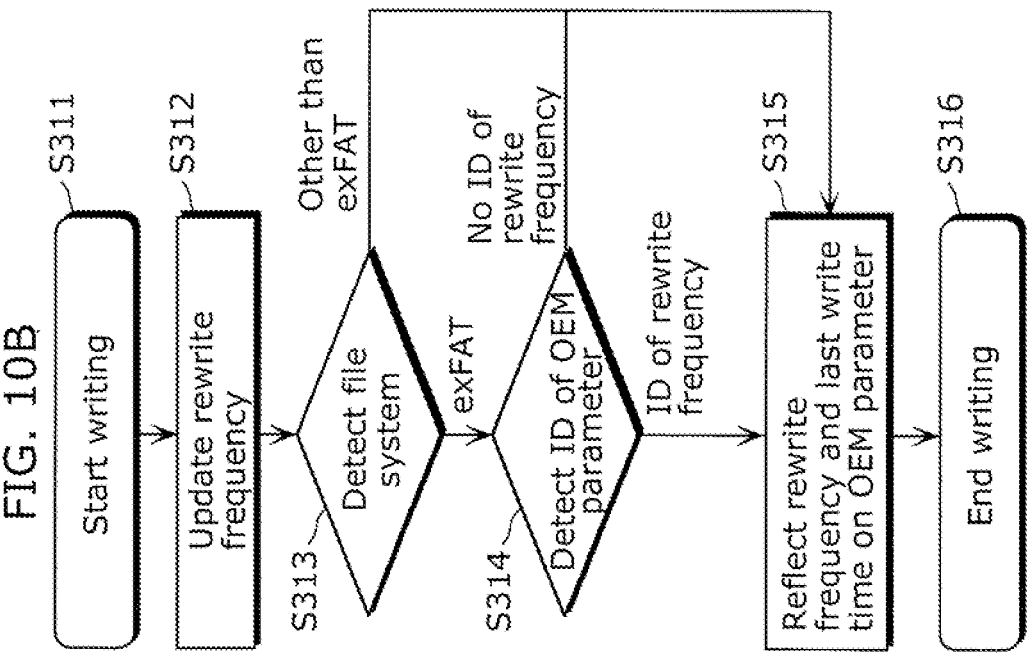
FIG. 10A is a flowchart in the case of initializing the semiconductor memory device in the semiconductor memory system according to the third embodiment.

The following describes an operational process of the semiconductor memory system according to the third embodiment, with reference to FIGS. 10A and 10B. FIG. 10A is a flowchart showing a process flow of an initialization process when the host 300 detects the semiconductor memory device 310, according to the third embodiment. FIG. 10B is a flowchart showing a process flow in the case where the host 300 writes data to the semiconductor memory device 310, according to the third embodiment.

The initialization process flow according to this embodiment is described first, with reference to FIG. 10A.

In FIG. 10A, the operations in Steps S301 to S305 and S307 are basically the same as the operations in Steps S201 to S206 in the second embodiment shown in FIG. 6A.

In this embodiment, Step S306 is added to the initialization process flow of the second embodiment. In detail, after the host 300 detects the semiconductor memory device 310 and stores the rewrite frequency data read from the flash memory 140 in the rewrite frequency storage unit 256 (Step S305), the host 300 writes the current time indicated by the timer 301 to the OEM parameter field shown in FIG. 9 (Step S306).

Thus, in this embodiment, the initialization is performed when, for example, the semiconductor memory device 310 is connected to the host 300. When reading the rewrite frequency corresponding to the GUID identifying the rewrite frequency from the semiconductor memory device 310 and storing it in the rewrite frequency storage unit 256, the current time is written as a predetermined OEM parameter in the semiconductor memory device 310.

The writing process flow in the case where the host 300 writes data to the semiconductor memory device 310 is described next, with reference to FIG. 10B.

In FIG. 10B, the operations in Steps S311 to S316 are basically the same as the operations in Steps S211 to S216 in the second embodiment shown in FIG. 6B.

In this embodiment, however, Step S315 differs from Step S215 in the second embodiment. In Step S315, when writing to the semiconductor memory device 310, the write time indicated by the timer 301 is reflected on a storage area corresponding to third identification information associated with the write time.

In detail, when the GUID identifying the rewrite frequency is detected in Step S314, in Step S315 the memory information management unit 350 in the semiconductor memory device 310 reflects not only the rewrite frequency but also the last write time, on the field (storage area) of the OEM parameter corresponding to the GUID identifying the rewrite frequency (Step S315). Note that, in this embodiment, the GUID (first identification information) identifying the rewrite frequency is used as the third identification information associated with the write time, as mentioned above.

Figure 11:
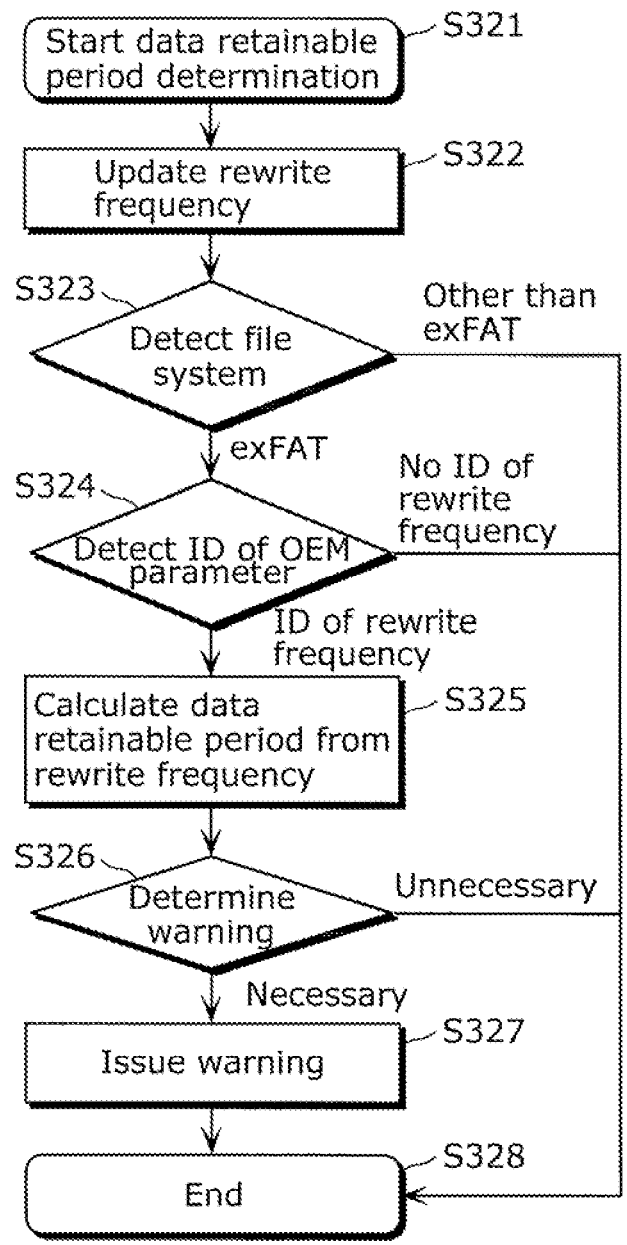
FIG. 11 is a flowchart showing a retention determination process flow in the semiconductor memory system according to the third embodiment.
Figure 12:
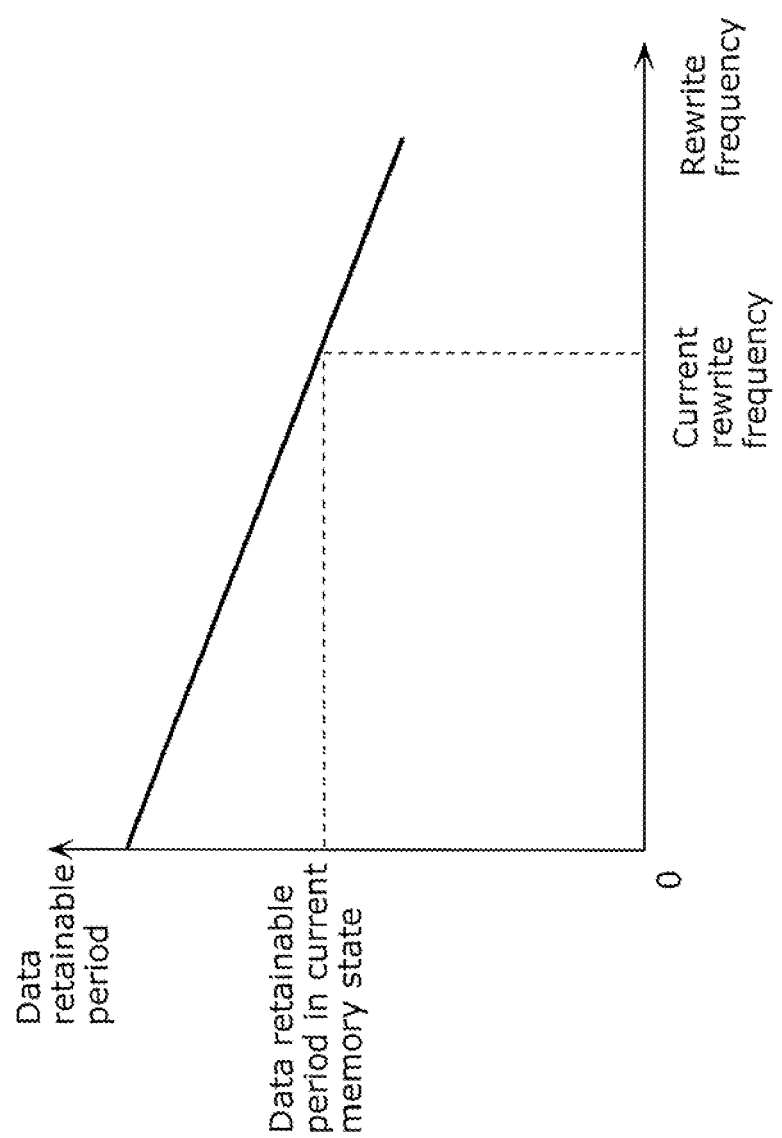
FIG. 12 is a diagram showing a graph that is used to calculate a data retainable period in retention determination of the semiconductor memory system according to the third embodiment.

The following describes an operational process of retention determination in the semiconductor memory system according to the third embodiment, with reference to FIGS. 11 and 12. FIG. 11 is a flowchart showing a process flow of retention determination in the semiconductor memory system according to the third embodiment.

In this embodiment, the retention determination unit 353 determines whether or not data stored in the flash memory 140 in the semiconductor memory device 310 is within a data retainable period.

As shown in FIG. 11, according to a predetermined control command from the host 300 and the like or at a predetermined timing, the determination of whether or not the data stored in the flash memory 140 is within the data retainable period starts (Step S321). For example, the determination starts when the semiconductor memory device 310 is connected to the host 300.

At this time, the memory information management unit 350 updates the rewrite frequency of the flash memory 140 stored in the rewrite frequency storage unit 156 (Step S322).

Next, the FS detection unit 251 detects the format of the file system managing the flash memory 140 (Step S323). In detail, the FS detection unit 151 reads predetermined data from the flash memory 140 to detect the format of the file system managing the flash memory 140, and specifies the type of the formatted file system.

When the type of the file system is other than exFAT in Step S323, the process goes to a determination end step (Step S328). When the type of the file system is exFAT, the process goes to the next step (S324).

When the FS detection unit 151 detects exFAT as the file system of the flash memory 140 in Step S323, the ID detection unit 152 searches all OEM parameter fields in the flash memory 140, to detect whether or not the GUID identifying the rewrite frequency is present among the OEM parameters. When the GUID identifying the rewrite frequency is present, the ID detection unit 152 detects the GUID identifying the rewrite frequency (Step S324).

When the GUID identifying the rewrite frequency is not present in Step S324, the process goes to the determination end step (Step S328). When the GUID identifying the rewrite frequency is present, the process goes to the next step (Step S325).

When the GUID identifying the rewrite frequency is detected in Step S324, the semiconductor memory device 310 calculates a data retainable period on the basis of the rewrite frequency stored in the OEM parameter field shown in FIG. 9 (Step S325).

A process of calculating the data retainable period is described below, with reference to FIG. 12. FIG. 12 is a diagram showing a graph used for calculating the data retainable period in the retention determination in the semiconductor memory system according to the third embodiment, and shows a correlation between the data retainable period and the rewrite frequency. In FIG. 12, the vertical axis represents the data retainable period, and the horizontal axis represents the rewrite frequency.

As shown in FIG. 12, the data retainable period and the rewrite frequency have such a relation that the data retainable period decreases as the rewrite frequency increases. For ease of illustration, this relation is indicated by a straight line in FIG. 12.

On the basis of the relation shown in FIG. 12, "data retainable period in current memory state" can be determined from "current rewrite frequency".

Next, the retention determination unit 353 calculates an elapsed time from the last write time at which data is written last, on the basis of the last write time and the current time. The retention determination unit 353 then compares the elapsed time with the data retainable period calculated in Step S325, to determine whether or not to issue a warning (Step S326).

For instance, a predetermined warning is issued when the elapsed time exceeds the data retainable period. Note that the current time can be obtained by reading the current time stored in the OEM parameter field in the flash memory 140 in the semiconductor memory device 310.

When the retention determination unit 353 determines not to issue the warning in Step S326, the process goes to the determination end step (Step S328). When the retention determination unit 353 determines to issue the warning, the process goes to the next step (Step S327).

When the retention determination unit 353 determines to issue the warning, the memory information management unit 350 issues the warning that the data retainable period is exceeded, to the host 300 (Step S327).

The process then goes to the determination end step (Step S328), where the determination ends.

As described above, in the semiconductor memory system according to the third embodiment, when the file system managing the semiconductor memory device 310 is a specific file system having device dependent parameters such as exFAT, device-specific information can be obtained by a uniform access method merely by the operation of the host 300 through the use of the file system function of the host 300, without specifying the type of the semiconductor memory device 310, as in the second embodiment. Therefore, the rewrite frequency of the flash memory 140 can be obtained by a uniform access method, regardless of the type of the semiconductor memory device 310.

Moreover, in the semiconductor memory system according to the third embodiment, when the file system managing the semiconductor memory device 310 is a specific file system having device dependent parameters such as exFAT, the data retainable period for the semiconductor memory device 310 having retention characteristics can be calculated by a uniform access method merely by the operation of the host 300 through the use of the file system function of the host 300, without specifying the type of the semiconductor memory device 310. This ensures reliability of data stored in the semiconductor memory device 310. Besides, there is no need to change a criterion for determining the reliability in the host 300 depending on the characteristics of the flash memory 140 in the semiconductor memory device 310.

The third embodiment describes the case where the rewrite frequency storage unit is included in the semiconductor memory device 310, but the same advantageous effects can be achieved even when the rewrite frequency storage unit is included in the host 300.

The third embodiment describes the case where the timer 301 is provided in the host 300 and the retention determination unit 353 is provided in the semiconductor memory device 310, but the present invention is not limited to this. For instance, the timer may be provided in the memory information management unit 350 in the semiconductor memory device 310, and the retention determination unit in the memory information update unit 340 in the host 300. As an alternative, the timer and the retention determination unit may be provided solely in the memory information management unit 350 in the semiconductor memory device 310, or solely in the memory information update unit 340 in the host 300.

Although a semiconductor memory device and a semiconductor memory system according to the present invention have been described by way of the embodiments, the present invention is not limited to these embodiments.

For example, though the flash memory is used as the nonvolatile memory in the above embodiments, the same advantageous effects can be achieved even when the present invention is applied to other nonvolatile memories.

The present invention also includes any other modifications to the embodiments that can be conceived by a person skilled in the art or any combinations of features in different embodiments, without departing from the scope of the present invention.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

A semiconductor memory device and a semiconductor memory system according to the present invention are widely applicable as a semiconductor memory device such as a memory card and a semiconductor memory system including a semiconductor memory device such as a memory card. A semiconductor memory device and a semiconductor memory system according to the present invention are particularly useful in areas such as industrial video recording where reliability is required, because they can be used independently of the device type.

What is claimed is:

1. A semiconductor memory device that stores information, said semiconductor memory device comprising:
a nonvolatile memory that is managed by a predetermined file system which manages a parameter dependent on said semiconductor memory device, the parameter including a first storage area and a second storage area,
wherein said semiconductor memory device is configured to store a rewrite frequency of said nonvolatile memory,
wherein said semiconductor memory device is configured to detect whether or not first identification information is stored in the first storage area of the parameter, the first identification information being a rewrite frequency identifier indicating that the rewrite frequency of said nonvolatile memory is stored in said semiconductor memory device, and
wherein said semiconductor memory device is configured to, when said semiconductor memory device detects that the first identification information is stored, reflect the rewrite frequency stored in said semiconductor memory device on the second storage area of the parameter corresponding to the first identification information.

2. The semiconductor memory device according to claim 1, wherein the second storage area corresponding to the first identification information is a storage area in said nonvolatile memory.

3. The semiconductor memory device according to claim 1, wherein said nonvolatile memory is divided into a plurality of blocks,
wherein said semiconductor memory device is configured to store, as the rewrite frequency, a rewrite frequency of each of the plurality of blocks, and
wherein said semiconductor memory device is further configured to detect whether or not second identification information is stored in said nonvolatile memory as the parameter, the second identification information indicating that the rewrite frequency of said nonvolatile memory is managed separately for each of the plurality of blocks.

4. The semiconductor memory device according to claim 3, wherein the first identification information is set for each of the plurality of blocks.

5. The semiconductor memory device according to claim 1, further comprising a timer that indicates time,
wherein said semiconductor memory device is configured to determine, by referencing said timer, whether or not data stored in said nonvolatile memory is reliable, on the basis of a write time at which writing is performed to said nonvolatile memory and a current time, and wherein said semiconductor memory device is configured to, when the information is written to said nonvolatile memory, reflect the write time indicated by said timer on a storage area corresponding to third identification information associated with the write time.

6. The semiconductor memory device according to claim 1, wherein said semiconductor memory device is configured to detect a format of the predetermined file system.

7. The semiconductor memory device according to claim 6, wherein the predetermined file system is exFAT, and
wherein said semiconductor memory device is configured to, when said file system detection unit detects exFAT as the predetermined file system, detect whether or not the first identification information is stored in the first storage area.

8. The semiconductor memory device according to claim 1, wherein said nonvolatile memory is a flash memory.

9. A semiconductor memory system comprising:
a semiconductor memory device including a nonvolatile memory that is managed by a predetermined file system which manages a parameter dependent on said semiconductor memory device, the parameter including a first storage area and a second storage area; and
a host apparatus configured to manage information of said semiconductor memory device,
wherein said host apparatus is configured to store a rewrite frequency of said semiconductor memory device,
wherein said host apparatus is configured to detect whether or not first identification information is stored in the first storage area of the parameter, the first identification information being a rewrite frequency identifier indicating that the rewrite frequency of said nonvolatile memory is stored in said host apparatus,
wherein said host apparatus is configured to, when said host apparatus detects that the first identification information is stored, reflect the rewrite frequency stored in said host apparatus on the second storage area of the parameter corresponding to the first identification information.

10. The semiconductor memory system according to claim 9,
wherein the second storage area corresponding to the first identification information is a storage area in said nonvolatile memory.

11. The semiconductor memory system according to claim 9,
wherein said nonvolatile memory is divided into a plurality of blocks,
wherein said host apparatus is configured to store, as the rewrite frequency, a rewrite frequency of each of the plurality of blocks, and
wherein said host apparatus is configured to detect whether or not second identification information is stored in said nonvolatile memory as the parameter, the second identification information indicating that the rewrite frequency of said nonvolatile memory is managed separately for each of the plurality of blocks.

12. The semiconductor memory system according to claim 11,
wherein the first identification information is set for each of the plurality of blocks.

13. The semiconductor memory system according to claim 9,
wherein said host apparatus includes a timer that indicates a time,
wherein said host apparatus is configured to determine, by referencing said timer, whether or not data stored in said semiconductor memory device is reliable, on the basis of a write time at which writing is performed to said semiconductor memory device and a current time, and
wherein said host apparatus is further configured to, when information is written to said semiconductor memory device, reflect the write time indicated by said timer on a storage area corresponding to third identification information associated with the write time.

14. The semiconductor memory system according to claim 9,
wherein one of said host apparatus and said semiconductor memory device includes a timer that indicates a time,
wherein the other one of said host apparatus and said semiconductor memory device is configured to determine, by referencing said timer, whether or not data stored in said semiconductor memory device is reliable, on the basis of a write time at which writing is performed to said semiconductor memory device and a current time, and
wherein said host apparatus or said semiconductor memory device is configured to, when information is written to said semiconductor memory device, reflect the write time indicated by said timer, on a storage area corresponding to third identification information associated with the write time.

15. The semiconductor memory system according to claim 9,
wherein said host apparatus is configured to detect a format of the predetermined file system.

16. The semiconductor memory system according to claim 15,
wherein the predetermined file system is exFAT, and
wherein said host apparatus is configured to, when said file system detection unit detects exFAT as the predetermined file system, detect whether or not the first identification information is stored in the first storage area.

17. The semiconductor memory system according to claim 9,
wherein said nonvolatile memory is a flash memory.

18. A method for use in a semiconductor memory device that stores information, the semiconductor memory device including a nonvolatile memory that is managed by a predetermined file system which manages a parameter dependent on the semiconductor memory device, the parameter including a first storage area and a second storage area, and the semiconductor memory device being configured to store a rewrite frequency of the nonvolatile memory, said method comprising:
detecting whether or not first identification information is stored in the first storage area of the parameter, the first identification information being a rewrite frequency identifier indicating that the rewrite frequency of said nonvolatile memory is stored in the semiconductor memory device; and
reflecting, when said detecting detects that the first identification information is stored in the first storage area of the parameter, the rewrite frequency stored in the semiconductor memory device on the second storage area of the parameter corresponding to the first identification information.

* * * * *